(12) United States Patent
Heikenfeld et al.

(10) Patent No.: US 9,180,454 B2
(45) Date of Patent: Nov. 10, 2015

(54) ELECTROWETTING AND ELECTROFLUIDIC DEVICES WITH LAPLACE BARRIERS AND RELATED METHODS

(75) Inventors: Jason Heikenfeld, Cincinnati, OH (US); Manjeet Dhindsa, Eindhoven (NL); Eric Kreit, Cincinnati, OH (US)

(73) Assignee: University Of Cincinnati, Cincinnati, OH (US)

( * ) Notice: Subject to any disclaimer, the term of this patent is extended or adjusted under 35 U.S.C. 154(b) by 929 days.

(21) Appl. No.: 13/389,726

(22) PCT Filed: Aug. 13, 2010

(86) PCT No.: PCT/US2010/045463
§ 371 (c)(1),
(2), (4) Date: Mar. 6, 2012

(87) PCT Pub. No.: WO2011/020013
PCT Pub. Date: Feb. 17, 2011

(65) Prior Publication Data
US 2012/0168309 A1 Jul. 5, 2012

Related U.S. Application Data

(60) Provisional application No. 61/234,070, filed on Aug. 14, 2009, provisional application No. 61/234,099, filed on Aug. 14, 2009, provisional application No. 61/307,637, filed on Feb. 24, 2010, provisional application No. 61/308,105, filed on Feb. 25, 2010.

(51) Int. Cl.
*G01N 27/447* (2006.01)
*B01L 3/00* (2006.01)
*G02B 26/00* (2006.01)

(52) U.S. Cl.
CPC ......... *B01L 3/502792* (2013.01); *G02B 26/004* (2013.01); *B01L 3/502715* (2013.01)

(58) Field of Classification Search
CPC ............ B01L 3/5027; B01L 3/502715; B01L 3/50273; B01L 3/502784; B01L 3/502792
See application file for complete search history.

(56) References Cited

U.S. PATENT DOCUMENTS 6,958,132 B2   10/2005   Chiou et al.
2002/0012856 A1   1/2002   Ohtsu et al.
(Continued)

OTHER PUBLICATIONS

U.S. Patent and Trademark Office, International Search Report and Written Opinion in corresponding International Application No. PCT/US10/45472 mailed Oct. 14, 2010, 10 pp.
(Continued)

*Primary Examiner* — J. Christopher Ball
(74) *Attorney, Agent, or Firm* — Wood Herron & Evans LLP

(57) ABSTRACT

Electrowetting and electrofluidic devices and methods. The device includes a hydrophobic channel formed between first and second substrates and a polar fluid and a non-polar fluid contained in the channel. An electrode with a dielectric layer is electrically connected to a voltage source. A Laplace barrier within the hydrophobic channel defines a fluid pathway that is open to the movement of the polar fluid within the channel. The polar fluid moves to a first position when the voltage source is biased at a first voltage that is less than or equal to a threshold voltage. The polar fluid moves to a second position when the voltage source is biased with a second voltage that is greater than the first voltage.

31 Claims, 22 Drawing Sheets

(56) References Cited

U.S. PATENT DOCUMENTS

| | | | |
|---|---|---|---|
| 2004/0057143 | A1 | 3/2004 | Steinfield et al. |
| 2005/0046673 | A1 | 3/2005 | Silverbrook |
| 2005/0285835 | A1 | 12/2005 | Jessop |
| 2007/0115532 | A1 | 5/2007 | Chen et al. |
| 2008/0230836 | A1 | 9/2008 | Ajiki |
| 2009/0043082 | A1 | 2/2009 | Stoffel et al. |
| 2009/0195850 | A1 | 8/2009 | Takahashi |

OTHER PUBLICATIONS

U.S. Patent and Trademark Office, International Search Report and Written Opinion in corresponding International Application No. PCT/US10/45463 mailed Oct. 14, 2010, 11pp.

Bach, U. et al. Nanomaterials-Based Electrochomics for Paper-Quality Display. Advanced Materials 14, 845-848, 2002.

K.A. Dean, M.R. Johnson, E. Howard, K. Zhou and J. Heikenfeld. Development of Flexible Electrowetting Displays, Proc. Soc. Inf. Display, P51.4, 772-775, (2009).

M. Dhindsa, J. Heikenfeld, S. Kwon, J. Park, P.D. Rack, I. Papautsky, Virtual electrowetting channels: electronic liquid transport with continuous channel functionality, Lab on a Chip. 10(7): (2010), 832-836.

R. Fair. Digital microfluidics: is a true lab-on-a-chip possible? Microfluidics and Nanfluidics 3, 245-281, (2007).

J. Song, R. Evans, Y. Lin, B. Hsu and R. Fair, A Scaling Model for Electrowetting-on-Dielectric, Microfluidic Actuators Microfluidics Nanofluidics, 2009, 7, 75-89.

Gelink, G.H. et al. A rollable, organic electrophoretic QVGA display with field-shielded pixel architecture. J. Soc. Inf. Display 14, 113-118, (2006).

Hattori, R. et al. A novel bistable reflective display using quick-response liquid powder. J. Soc. Inf. Display 12, 75-80, (2004).

Hayes, R.A. & Feenstra, B.J. Video-speed electronic paper based on electrowetting. Nature 425, 383-385, (2003).

J. Heikenfeld, K. Zhou, B. Raj, E. Kreit, B. Sun, and R. Schwartz, Electrofluidic displays exploiting Young-Laplace transposition of brilliant pigment dispersions, Nature Photonics, vol. 3, No. 5, pp. 292-296, (2009).

K.-M.H. Lenssen, M.H.W.M. van Delden, M. Müller and L.W.G. Stofmeel, Bright Color Electronic Paper Technology and Applications, Proceedings of the IDW 2009, pp. 529-532.

M. Maillard, J. Legrand, B. Berge. Two Liquids Wetting and Low Husteresis Electrowetting on Dielectric Applications, Langmuir, vol. 25, No. 11, pp. 6162-6167, (2009).

Miles, M. et al. Digital Paper for reflective displays. Journal of the Society for Information Display 11, 209-215, (2003).

M. Bienia, M. Vallade, C. Quilliet and F. Mugele, Electrical-field-induced curvature increase on a drop of conducting liquid, 2006 Europhys. Lett 74 103-109.

A.A.S. Bhagat, S.S. Kuntaegowdanahalli, and I. Papautsky, Continuous particle separation in spiral microchannels using Dean flows and differential migration, Lab Chip, vol. 8, pp. 1906-1914, 2008.

A.A.S. Bhagat, S.S. Kuntaegowdanahalli, and I. Papautsky, Geometrically modulated inertial microfluidics for continuous particle filtration and extraction, Microfluid. Nanofluid., vol. 7, pp. 217-226, 2009.

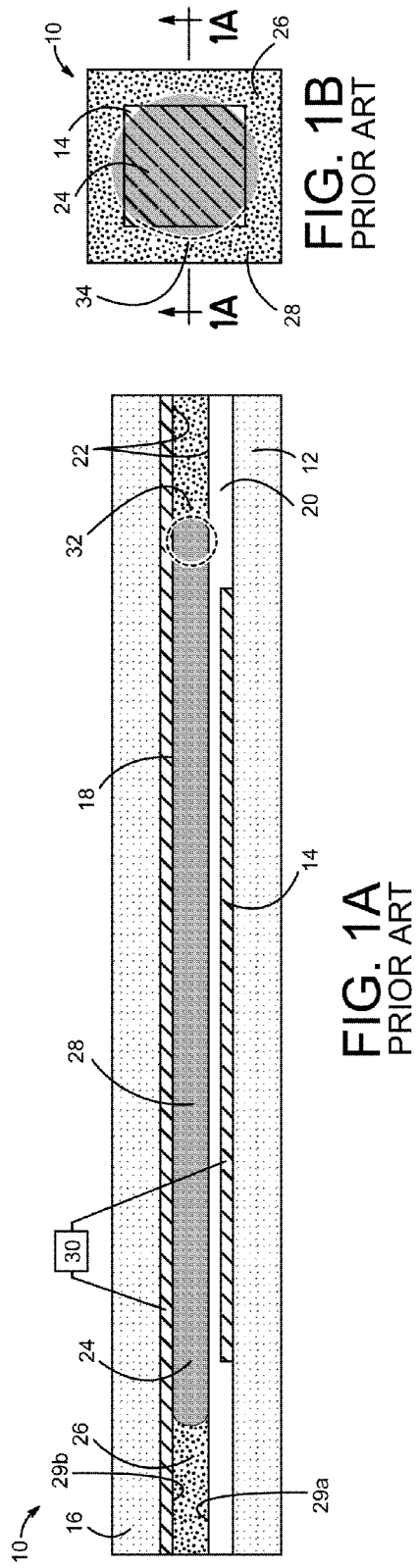

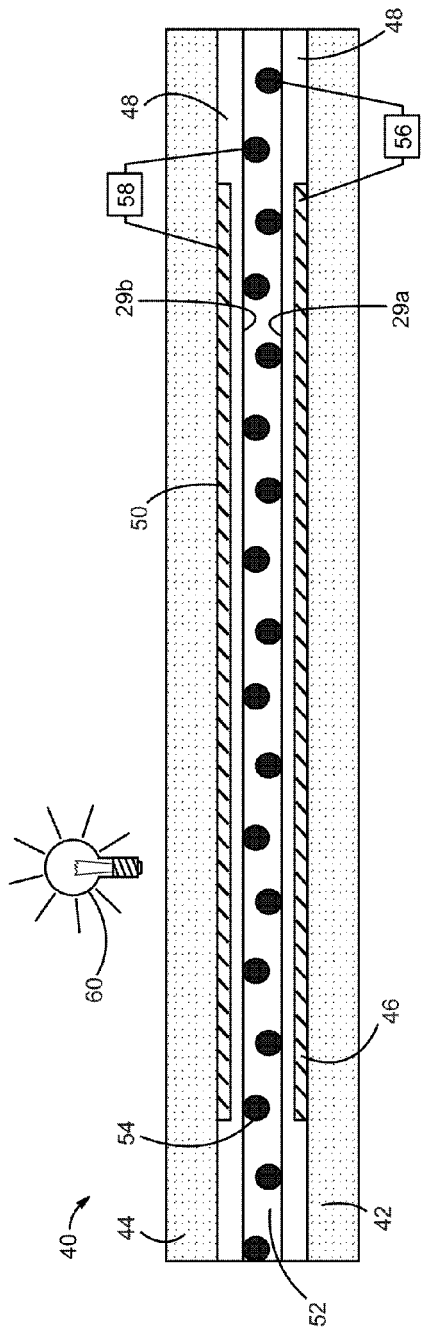
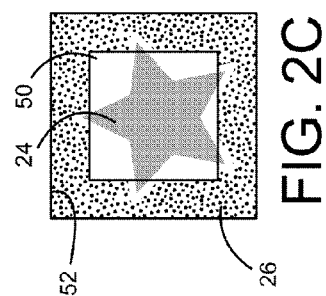

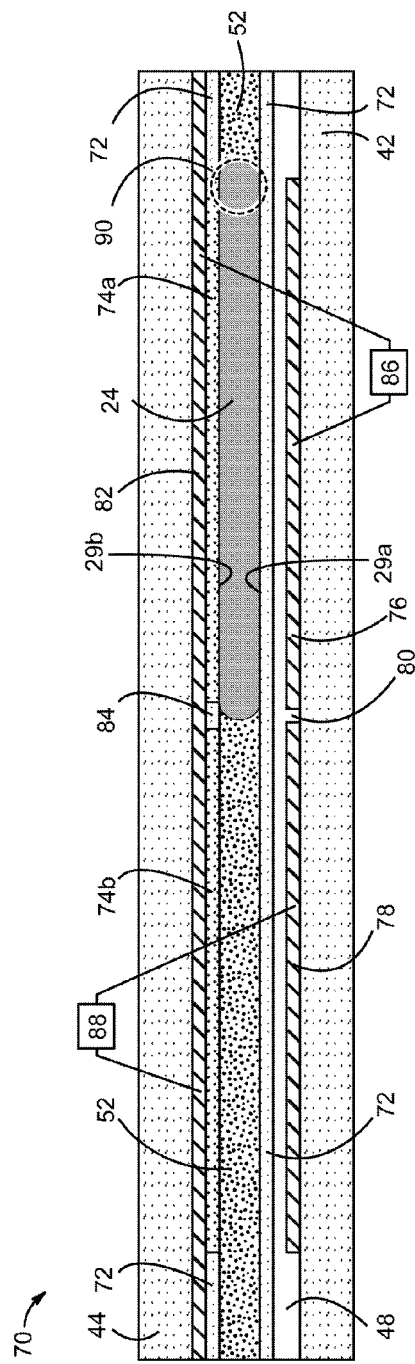
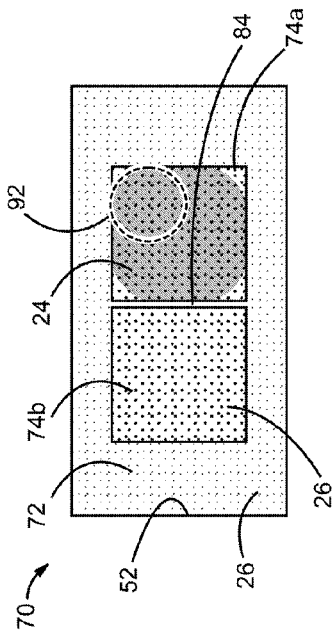
FIG. 3A
FIG. 3B

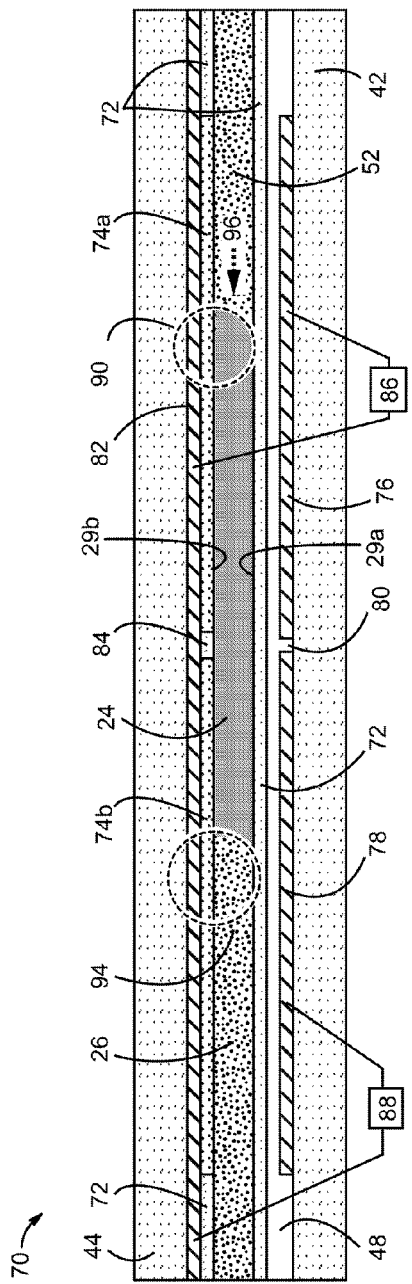
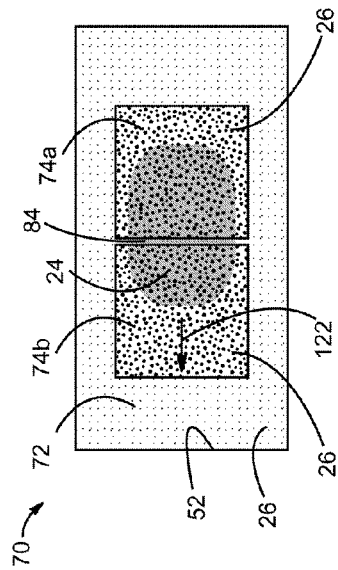
FIG. 3C
FIG. 3D

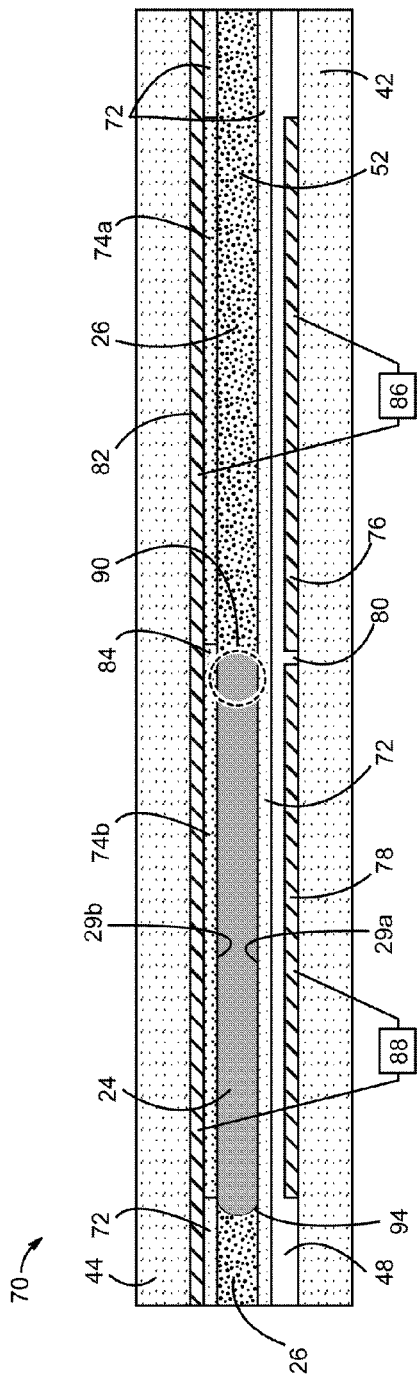
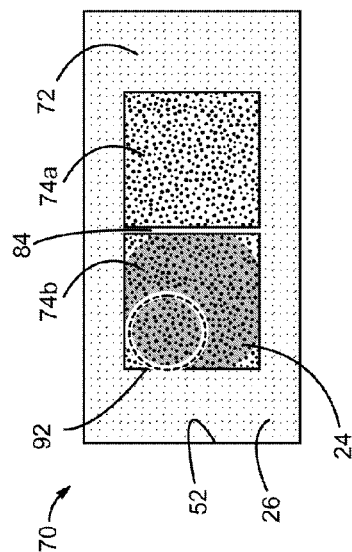
FIG. 3E
FIG. 3F

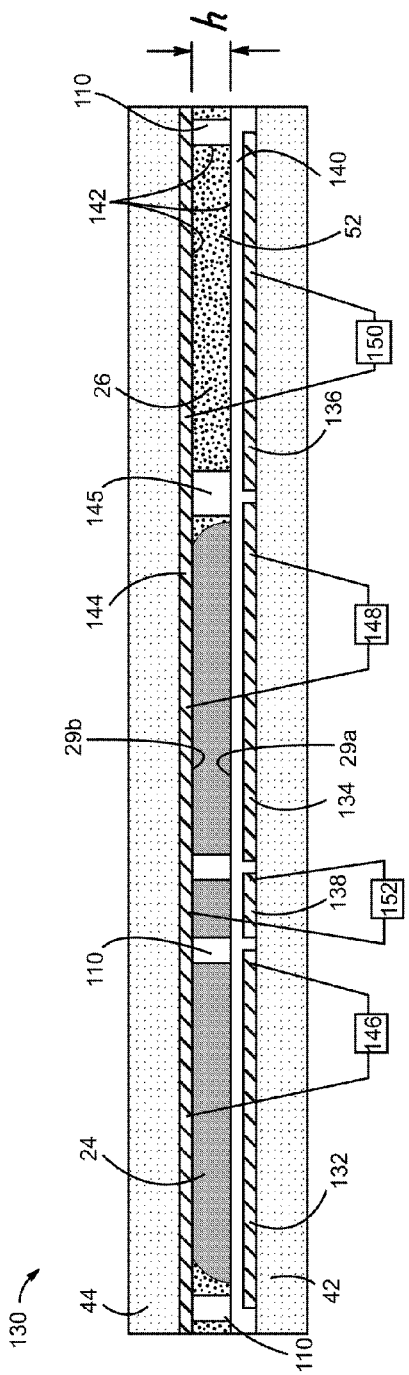
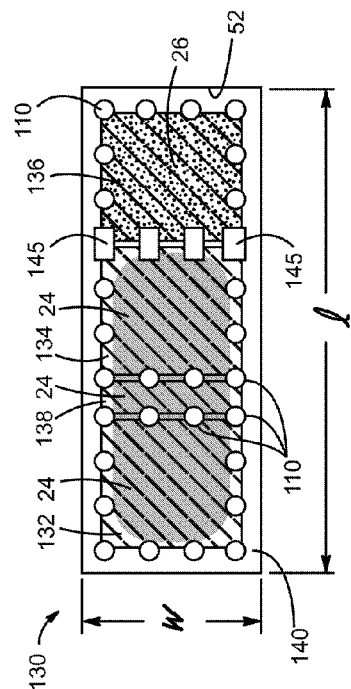
FIG. 5A
FIG. 5B

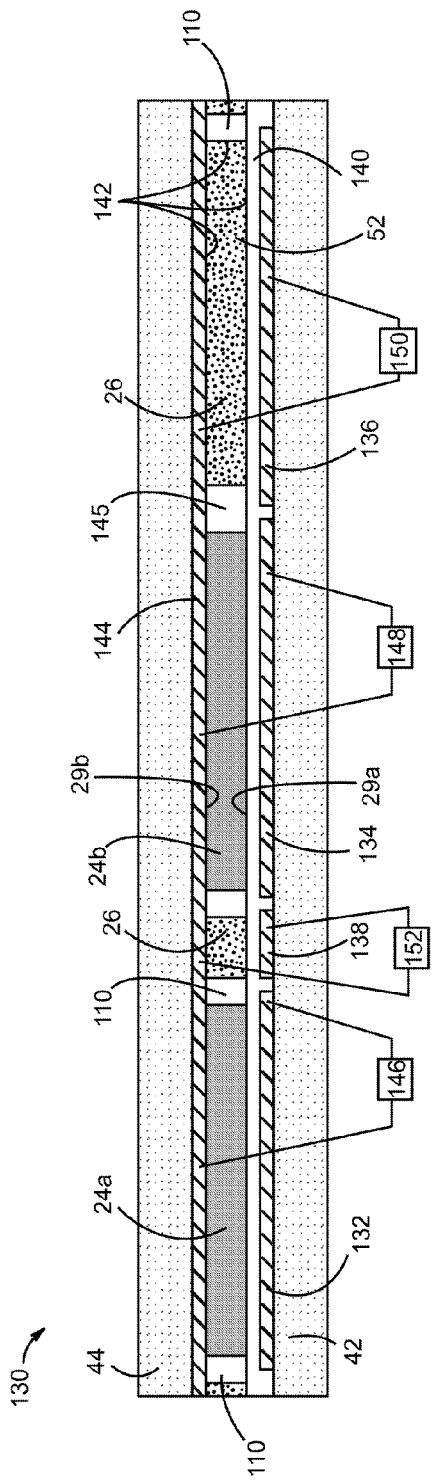
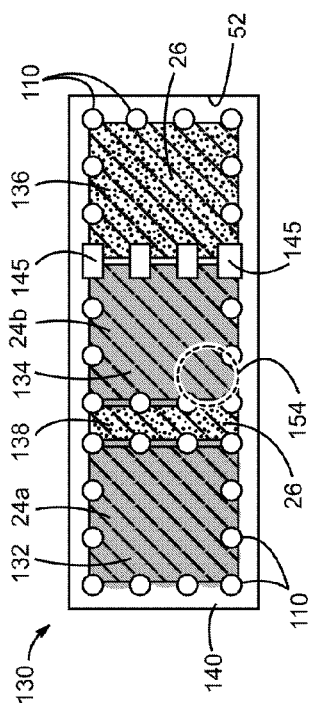
FIG. 5C
FIG. 5D

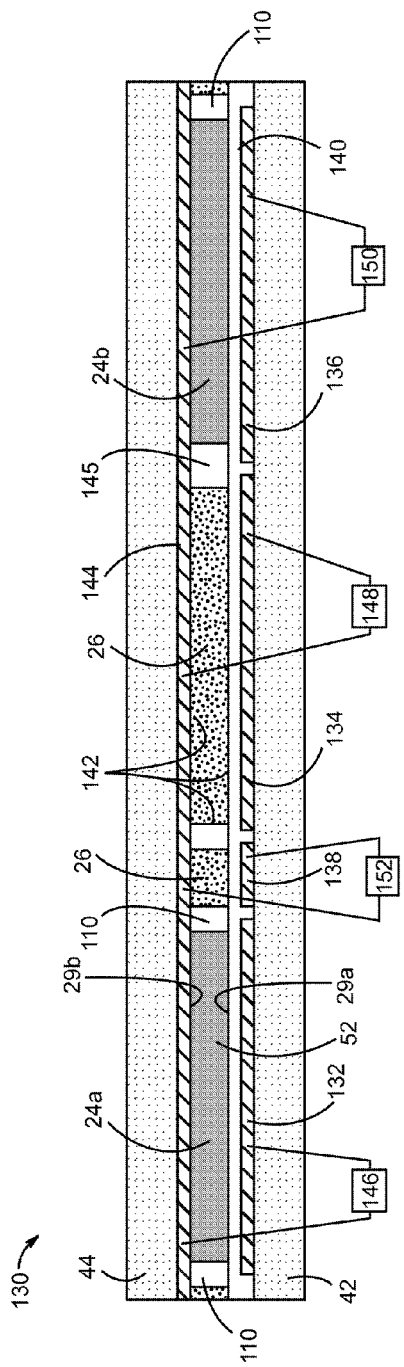
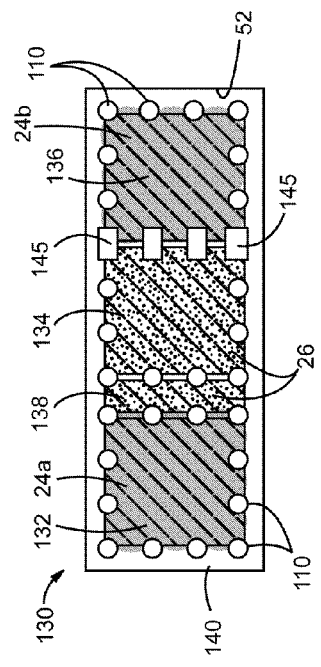
FIG. 5E
FIG. 5F

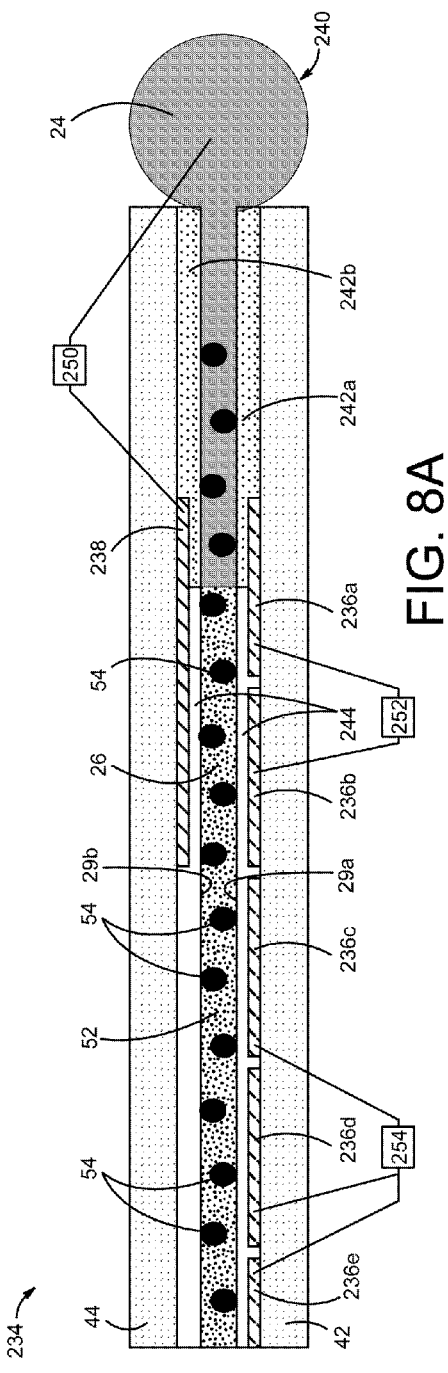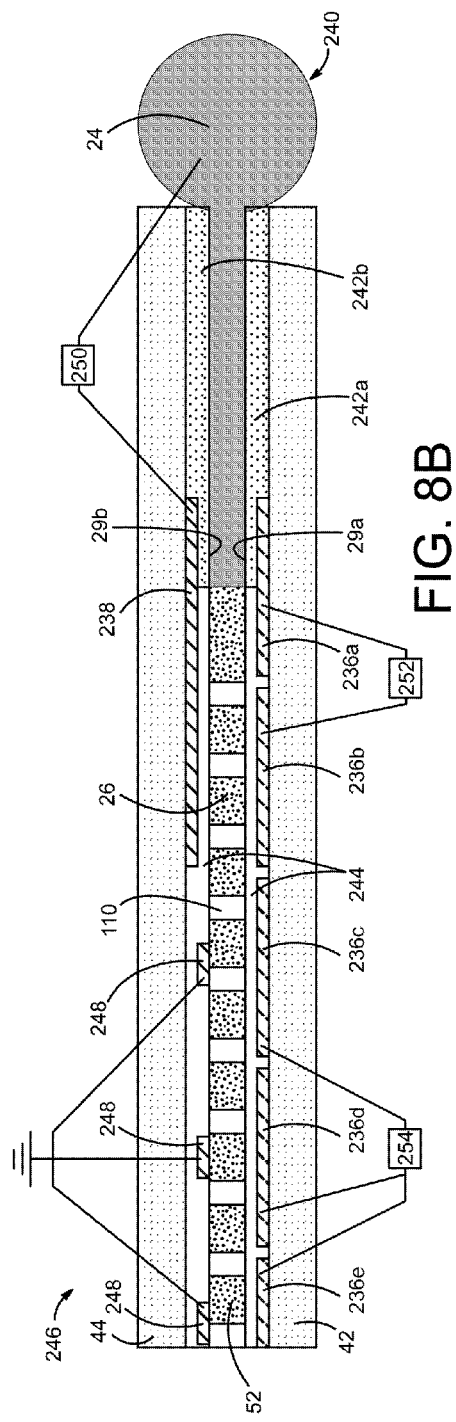

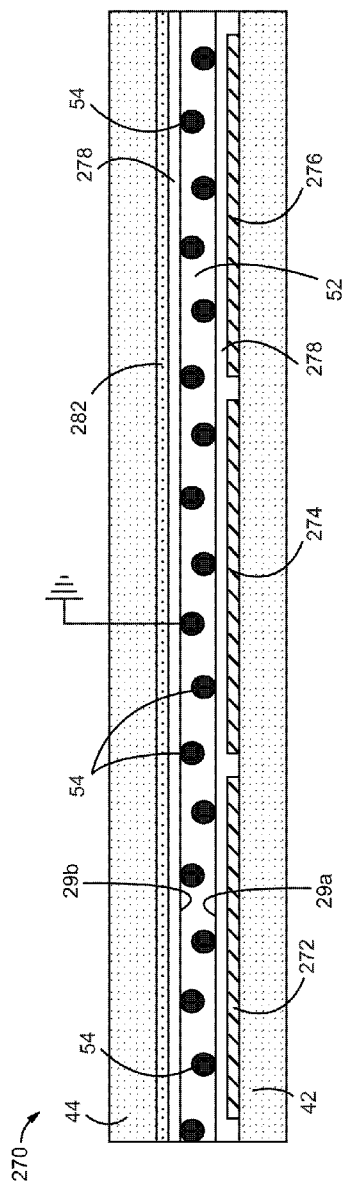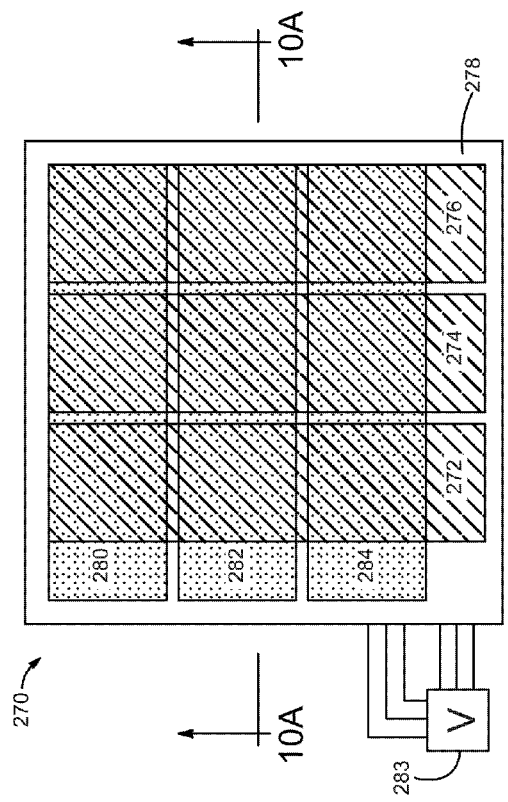
FIG. 10A
FIG. 10B

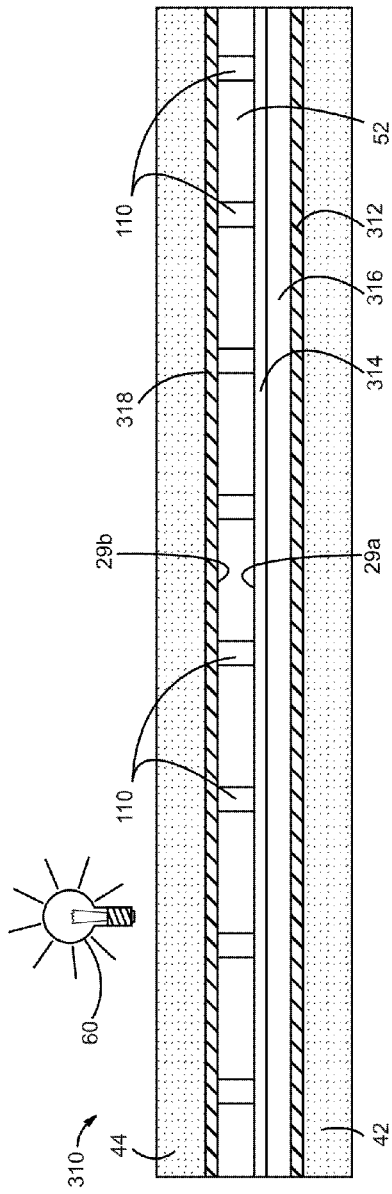
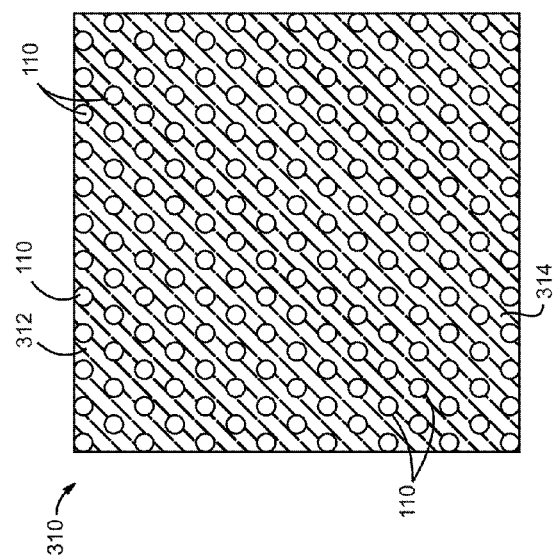

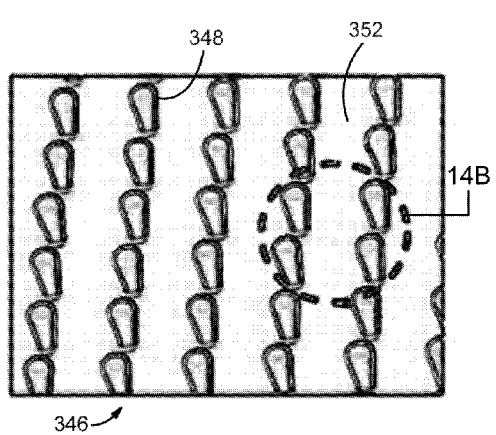
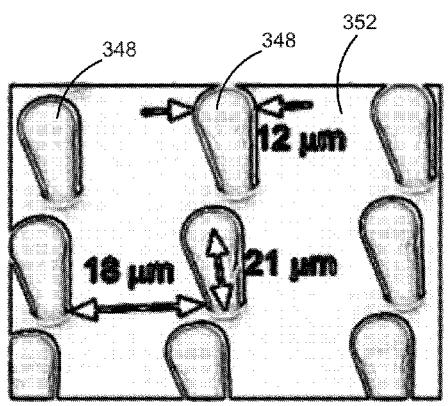
FIG. 14A  FIG. 14B
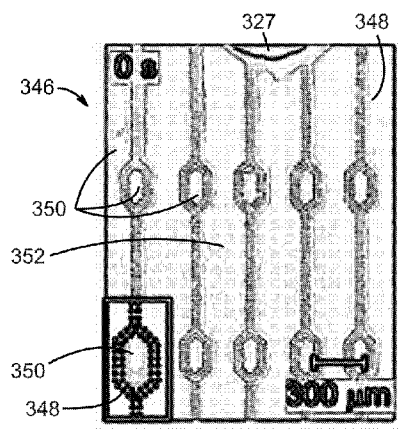
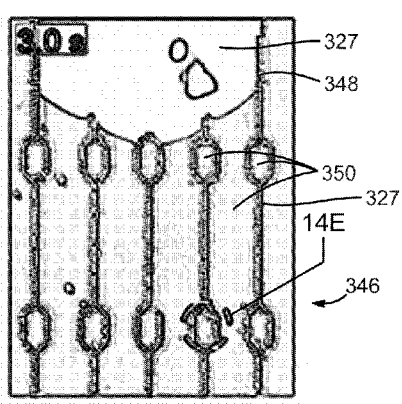
FIG. 14C  FIG. 14D
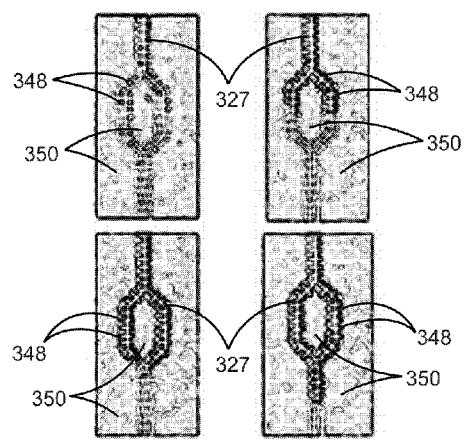
FIG. 14E

ELECTROWETTING AND ELECTROFLUIDIC DEVICES WITH LAPLACE BARRIERS AND RELATED METHODS

CROSS-REFERENCE TO RELATED APPLICATIONS

This application claims the benefit of U.S. Provisional Application No. 61/234,070, filed Aug. 14, 2009; U.S. Provisional Application No. 61/234,099, filed Aug. 14, 2009; U.S. Provisional Application No. 61/307,637, filed Feb. 24, 2010; and U.S. Provisional Application No. 61/308,105, filed Feb. 25, 2010. This application is related to International Application No. PCT/US10/45472, entitled DISPLAY PIXELS, DISPLAYS, AND METHODS OF OPERATING DISPLAY PIXELS, and filed on even date herewith. The disclosure of each of these applications is hereby incorporated by reference herein in its entirety.

STATEMENT REGARDING FEDERALLY SPONSORED RESEARCH OR DEVELOPMENT

The U.S. Government has a paid-up license in this invention and the right, in limited circumstances, to require the patent owner to license others on reasonable terms as provided for by the terms of Grant No. 0729250 awarded by the National Science Foundation and the terms of Grant No. 0640964 awarded by the National Science Foundation.

BACKGROUND

The present invention relates to electrofluidic and electrowetting devices and methods of operating electrofluidic and electrowetting devices.

Electrowetting is a highly attractive modulation scheme for a variety of optical applications. For example, electrowetting has been used to provide optical switches for fiber optics, optical shutters or filters for cameras and guidance systems, optical pickup devices, optical waveguide materials, and video display pixels. Electrowetting has also found application in lab-on-chip devices, primarily in the form of digital droplet-driven flow.

Despite the numerous commercial applications and a large body of on-going research, nearly all conventional electrowetting-based devices require a constant application of voltage to hold a polar fluid in a particular geometry. These devices are not 'bistable,' that is to say, when the voltage is removed, the fluid is free to return to a spherical geometry along all non-confined fluid surfaces.

What is needed is a technology that improves on conventional devices that operate through electrowetting and electrofluidic principles.

SUMMARY

Embodiments of the invention generally relate to controlling polar fluid geometry with Laplace barriers and electrowetting or electrofluidic flow devices with Laplace barriers In accordance with an embodiment of the invention, an electrofluidic or electrowetting device includes a polar fluid and a non-polar fluid. The fluids occupy a hydrophobic channel formed between first and second substrates. An electrode with a dielectric layer, which separates the electrode from the fluids, is electrically connected to a voltage source. This electrode and dielectric layer arrangements can cause the polar fluid to advance or move within the hydrophobic channel. A Laplace barrier within the hydrophobic channel defines a fluid pathway that is open to the movement of the polar fluid. The polar fluid moves to a first position within the hydrophobic channel by biasing the electrode with a first voltage that is less than or equal to a threshold voltage. The polar fluid then moves to a second position within the hydrophobic channel when the electrode is biased with a second voltage that is greater than the first voltage.

When the electrode is biased with the first voltage, the Laplace barrier may restrain the polar fluid at the first position. The Laplace barrier operates by reliance on Laplace pressure.

In accordance with another embodiment of the invention, a method is provided for operating a device. The method includes moving a polar fluid to a first position within the device and restraining the polar fluid at the first position by a Laplace barrier.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

FIG. 1A is a diagrammatic cross-sectional view of a conventional electrowetting device.

FIG. 1B is a top view of FIG. 1A.

FIG. 1C is a diagrammatic cross-sectional view that is similar to FIG. 1A, but for an application of a voltage that reduces the contact angle for the polar fluid.

FIG. 1D is a top view of FIG. 1C.

FIG. 2A is a diagrammatic cross-sectional view of a device in accordance with an embodiment of the invention.

FIGS. 2B and 2C are top views of the device of FIG. 2A in each of the stable configurations.

FIG. 3A is a diagrammatic cross-sectional view of a device in accordance with another embodiment of the invention using a patterned surface energy Laplace barrier.

FIG. 3B is a top view of the electrofluidic device of FIG. 3A.

FIG. 3C is a diagrammatic cross-sectional view similar to FIG. 3A, but for an application of a voltage that moves the polar fluid from the first electrode toward a second electrode.

FIG. 3D is a top view of FIG. 3C.

FIG. 3E is a diagrammatic cross-sectional view similar to FIGS. 3A and 3C where the applied voltage has been removed after the polar fluid has reached the second electrode.

FIG. 3F is a top view of FIG. 3E.

FIGS. 5A, 5C, and 5E are diagrammatic cross-sectional views of a device in accordance with another embodiment of the invention.

FIGS. 5B, 5D, and 5F are top views of the devices shown in FIGS. 5A, 5C, and 5E, respectively.

FIGS. 8A-8B are diagrammatic cross-sectional views of devices in accordance with additional embodiments of the present invention.

FIG. 10A is a diagrammatic cross-sectional view of a device with passive matrix electrodes in accordance with another embodiment of the invention.

FIG. 10B is a top view of the device shown in FIG. 10A.

FIG. 12A is a diagrammatic cross-sectional view of a device with optically addressed virtual electrodes in accordance with another embodiment of the invention.

FIG. 12B is a top view of the device shown in FIG. 12A.

FIG. 14A-14I are scanning electron microscope and optical microscope images of various examples of one or more embodiments of the present invention.

DETAILED DESCRIPTION

Figure 4:
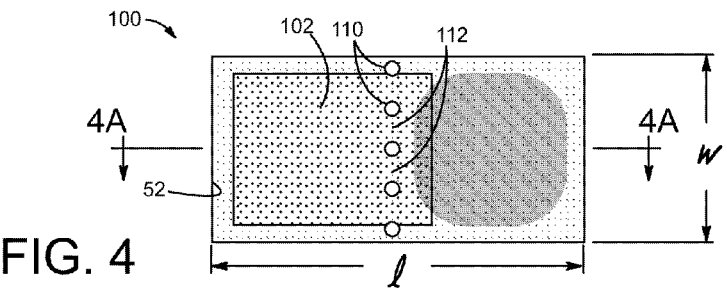
FIG. 4 is a top view of a device in accordance with another embodiment of the invention having a Laplace barrier comprising of spacers and in which no voltage is applied to the electrode.

Although the invention will be described in connection with certain embodiments, the description of the embodiments is intended to cover all alternatives, modifications, and equivalent arrangements as may be included within the spirit of the present invention. In particular, those of ordinary skill in the art will recognize that the components of the various electrofluidic devices described herein could be arranged in multiple different ways.

An electromechanical force on a conductive polar fluid that is adjacent to an electrically insulated electrode underlies the physical mechanism for at least one embodiment of the present invention. This electromechanical force originates near a line of contact between the conductive polar fluid and a dielectric that insulates the electrode. The electromechanical force is proportional to electrical capacitance times the square of the bias potential, or applied voltage. The electromechanical force is generally oriented such that it is directed outward from an exposed surface of the polar fluid. When the polar fluid is confined within a cavity or channel, this electromechanical force can also be interpreted as a force per unit area or a pressure. This arrangement provides high-speed operation (on the order of milliseconds), low power capacitive operation (about 10 mJ/m$^2$), and excellent reversibility. However, alternative embodiments of the present invention include other fluid manipulation methods that are well-known by those of ordinary skill in the art of microfluidics. These alternate methods include, but are not limited to, electrowetting without insulators, syringe-pumps, thermocapillary, photo-responsive molecules such as spiropyrans, dielectrophoresis, electrophoresis, and micro-electro-mechanical pumping. Various embodiments of Laplace barriers that are described herein will work equally well with alternate mechanisms of fluid manipulation and transport. In some embodiments, the Laplace barriers may be referred to as a partial fluid barrier or a porous fluid barrier.

A Cartesian coordinate system will be used to define specific directions and orientations. References to terms such as 'above,' upper, 'below,' and 'lower' are for convenience of description only and represent only one possible frame of reference for describing a particular embodiment. The dimensions of the devices described herein cover a wide range of sizes from nanometers-to-meters based on the application. Terms such as visible will be used in some cases to describe a person or machine vision system or other optical source or detector that is facing towards an upper surface of the embodiments described herein. Several of the diagrams will contain a 'side view' and a 'top view', the 'top view' being the direction normal to a substrate surface, usually a viewable area of the substrate, and in some cases in the direction of the viewer or observer of the device. These top-view diagrams can be partial device cross-sections in order to show the arrangement of only a particular sub-set of features and should not be always be considered as the actual top-view appearance of the device features.

The devices described herein are equally useful for reflective, transmissive, and transflective displays. Therefore light can transmit through or reflect from the upper surface, the lower surface, or both surfaces of the devices. Devices can operate in dual mode transmissive/reflective at the same time, or switch between such modes of operation on demand. Backlights or other light sources used in conventional displays are also fully compatible with the devices described herein and are included within the spirit of the present invention.

Light may be provided by a source that is positioned internal to the devices such as a backlight or frontlight, by waveguide or other optics, or by the ambient surroundings, such as sunlight or conventional light fixtures. Any means of coupling a light source is applicable, including all techniques known by those skilled in the art of displays.

The term fluid is used herein to describe any material or combination of materials that is neither solid nor plasma in its physical state. A gas may also be considered as a fluid so long as the gas moves freely according to the principles of the present invention. Solid materials, such as fluid powders, can also be considered a fluid if the solid materials move freely according to the principles of the present invention. The term fluid is not confining to any particular composition, viscosity, or surface tension. Fluids may also contain any weight percent of a solid material so long as that solid material is stably dispersed in the fluid. Fluids may also contain mixtures of multiple fluids, dispersants, resins, biocides, and other additives used in commercial fluids with demanding optical, temperature, electrical, fouling, or other performance specifications.

Examples of polar fluids include water, propylene glycol, and ethylene glycol. Examples of non-polar fluids include alkanes and silicone oils. Examples of gases include argon, carbon dioxide, and nitrogen. If more than one fluid is used that contains distinct solid particles or dissolved constituents, then it is preferred that the fluid be polar if particles or constituents are to be kept separated.

Non-polar fluids often penetrate small defects or situate against non-planar geometric structures. Therefore, mixing can occur with repeated movement of the non-polar fluid over a common device area. Polar fluids, in some cases, never touch solid surfaces. For instance in the case where the non-polar fluid forms a thin film between the polar fluid and solid surface.

Solid materials described herein serve multiple purposes.

Pigments and dyes in many cases are solid particles that can be dispersed or dissolved in fluids to alter at least one optical or spectral property of the fluid.

Substrates can be glass, plastic, metal foils, paper, or a variety of other materials that support construction of the devices described herein.

Spacers can be made of solid materials that are similar to the solid materials used in constructing the substrates. In some cases, the spacers can be part of the substrate itself, such spacers being formed by etching, laser processing, microreplication, or other technique. Spacers can also be formed from optically curable epoxies or photoresists, such as MICROCHEM SU-8 or DUPONT Per-MX.

Electrodes can be constructed from a transparent solid material, such as $In_2O_3$:$SnO_2$ or PEDOT:PSS, a reflective solid material such as aluminum (Al), or colored solid material such as carbon black, so long as the electrode material provides suitable electrical conductance. Voltage sources can be direct voltage sources from a power source or a locally generated voltage or current sources, such as thin-film transistors. Numerous direct, alternating, or other types of voltage sources are known to those skilled in the art of displays or microfluidics are applicable.

Dielectrics can include any solid material which provides suitable electrical insulation and, for example, can be inorganic such as silicon nitride (SiN), organic such as Parylene C, or fluorinated such as Parylene F, mixtures thereof, layers thereof, and combinations thereof. Dielectrics thicknesses can range from 10's nm to 10's μm resulting in operating voltages between 1 V and 120 V, respectively. Solid surfaces or films may be inherently hydrophobic, or provided with an order of hydrophobicity by addition of a film or coating, by plasma treatment, by molecular mono-layer treatment, or other means. Fluoropolymers such as CYTONIX Fluoropel and ASAHI Cytop provide exemplary hydrophobicity. Additional solid materials, which are not hydrophobic to the polar fluid such as water in a gas, may still be hydrophobic if the gas is replaced with a non-polar fluid that has surface tension that is similar to the solid material.

Generally, the term hydrophobic is used herein to describe a Young's wetting angle of >90°, and the term hydrophilic is used herein to describe a Young's wetting angle of <90°. However, hydrophobic or hydrophilic functionality may extend beyond these limits in certain devices or material configurations. Superhydrophobic coatings are those exhibiting a large Young's angle for a polar liquid in a gas and are achieved by geometrically texturing a surface.

Voltage sources can be direct voltage sources from a power source, locally generated voltage, or current sources such as thin-film transistors. Numerous direct, alternating, or other types of voltage sources known to those skilled in the art of displays or microfluidics are applicable. Voltage sources may be biased by 0V, a positive DC voltage, a negative DC voltage, or AC voltage or other as appropriate.

Reflector materials may include metal films, layers with different refractive indices including multilayer dielectrics, particle filled polymers or fluids where the particles differ in refractive index from the polymer or fluid, one- or multi-dimensional photonic crystals, or other reflectors that are known by those skilled in the art of optics and displays.

Scattering mediums include polymers or fluids having particles disperse therein and where the particles differ in refractive index from the polymer or fluid, structured polymers or metals, microreplicated optics, or other scattering features that are know by those skilled in the art of optics and displays.

Black matrix and color filters are any solid or fluid material that absorbs part of or the entire spectrum of light in reflection or transmission modes.

Unless otherwise noted, the terms concave and convex refer to the geometry associated with the smallest radius of curvature along an exposed meniscus of a fluid. It is understood that other larger radii of curvatures on a meniscus can be oppositely concave or convex, but have a weaker influence on the Laplace pressure of the meniscus. These additional radii are often not shown in the figures but are readily understood in terms of their weaker influence on device design and operation.

The term channel or hydrophobic channel will be used to describe physical confinement of a fluid that is horizontally larger than it is vertical in dimension, and which in some embodiments of the present invention will provide a means to visibly display a fluid. The channel is generally defined or bounded by one or more walls, typically of a fabricated or patterned substrate.

The term reservoir can be any feature formed as part of a device, or is external to the device, including any feature that can store or hold a fluid until it is ready to be moved inside, or into, a device. Reservoirs may also be simple inlet/outlet ports or vias that may or may not be connected to additional devices, chambers, or channels.

The term duct will be used to describe a feature which provides a pathway for fluid flow and, like the reservoir, can be integrated inside of device, or in some cases could be external to the device as well.

Fluids may be dosed into devices of the present invention using one of several methods. The polar fluid can be emulsed with the non-polar fluid and then physically, chemically, or optically separated from one another after the device is completed. The polar fluid can be vacuum dosed into the reservoir, non-polar fluid added, and the device sealed. The non-polar fluid can be dosed into a reservoir, the polar fluid added, and the device sealed. The polar fluid can be electrowetted into an area by application of voltage between the polar fluid and an electrode. Numerous alternatives and combinations of dosing combinations are included within the spirit of the present invention.

The above description provides examples of materials and components for embodiments of the invention; however, the description of any particular one embodiment is intended to cover all alternative materials, components, and arrangements known by those skilled in the arts of optics, displays, microfluidics, electrowetting, electrofluidics, microfabrication, electronics, and related disciplines.

With reference now to FIGS. 1A and 1B, a conventional electrowetting device 10 is shown for the purpose of building an understanding of the limitations of conventional technology. The device 10 includes a first substrate 12, a first electrode 14 on the first substrate 12, and a second substrate 16 that carries a second electrode 18. The first electrode 14, which is patterned in a square, cross-sectional geometry, is coated with a dielectric 20. The surfaces of the second electrode 18 and the dielectric 20 are hydrophobic by virtue of a hydrophobic layer 22. A polar fluid 24 and a non-polar fluid 26 occupy a channel 28 bounded by walls 29a, 29b of the two substrates 12, 16 or the fabricated layers thereon. A voltage source 30 is electrically coupled with the two electrodes 14, 18.

By virtue of the electrodes 14, 18, the voltage source 30 is electrically insulated and capacitively coupled to the polar fluid 24. Alternate conducting and insulating electrode arrangements are possible and are well known by those skilled in the art of electrowetting. As a voltage is applied to the voltage source 30, a contact angle for the polar fluid 24 will be reduced from the Young's angle ($\theta_Y$) to the electrowetted contact angle ($\theta_V$). This reduction in the contact angle is due to an electromechanical force that is generated by the electrowetting effect of the applied voltage.

As a first approximation, the electrowetting effect can be predicted according to:

$$\cos\theta_V = (\gamma_{od} - \gamma_{pd})/\gamma_{po} + CV^2/2\gamma_{po},$$

where C is capacitance per unit area of the dielectric 20; γ is the interfacial surface tension between the polar fluid 24 (p), the non-polar fluid 26 (o), the dielectric 20 (d); and V is the DC voltage or AC RMS voltage applied by the voltage source 30. The cosine of the Young's angle is predicted by $(\gamma_{od} - \gamma_{pd})/\gamma_{po}$. When the non-polar fluid 26 is an oil, a polar fluid 26 such as water or a glycol can exhibit a Young's angle of >160°. The $\theta_V$ can range from 30° to 60°. The Young's angle is not changed during electrowetting, except for microscopic changes. Yet for simplicity in diagramming herein, the $\theta_V$ will be drawn without such consideration.

With further reference to FIG. 1A, a large Young's angle and therefore a convex meniscus for the polar fluid 24 is apparent. This convex meniscus has a radius of curvature that leads to a Laplace pressure according to:

$$\Delta p = \gamma_{po}(1/R_1 + 1/R_2),$$

which includes the principle radii of curvature for the meniscii of the polar fluid 24 ($R_1, R_2$).

With further reference to of FIGS. 1A and 1B, the polar fluid 24 will have a smaller radius of curvature 32 that will present a dominent force over a larger radius of curvature 34 in determining the Laplace pressure. In the top view diagram of FIG. 1B, the meniscus is circular (as favored from a surface-tension perspective).

In FIGS. 1C and 1D, a voltage is applied from the voltage source 30, and the polar fluid 24 can be electromechanically forced into a geometry that is similar to the geometry of the first electrode 14. However, if the voltage is removed, the polar fluid 24 will regain a circular geometry that was illustrated in FIGS. 1A and 1B. Therefore, although this conventional electrowetting device 10 can use an applied voltage to alter the shape of the polar fluid 24, the device 10 inherently posses only one stable state, i.e., once the voltage is removed, the polar fluid 24 will regain the geometry of FIGS. 1A and 1B.

Similar features and numbers will be used throughout this written description and will be diagrammed using common markings, and need not always be duplicated in description.

FIGS. 2A-2C illustrate one example of an electrowetting or electrofluidic device 40, which may be bistable, according to a first embodiment of the invention. The device 40 includes a first substrate 42 and a second substrate 44. The first substrate 42 includes a first electrode 46 and a dielectric 48 on the first electrode 46, the first electrode 46 being representatively shaped as a circle, as shown in FIG. 2B. The second substrate includes a second electrode 50 and the dielectric 48 thereon, the second electrode 50 being shaped as a star, as shown in FIG. 2C. The enclosed space, or channel 52, formed between the electrodes 46, 50 includes a wire mesh 54 throughout. A first voltage source 56 couples the first electrode 46 to the wire mesh 54; a second voltage source 58 couples the second electrode 50 to the wire mesh 54. A light source 60 may be arranged external to, or otherwise associated with, the device 40 to form a viewable design.

As will be explained in greater detail below, the device 40 may be operated to form two separate and distinct stable configurations. In the first configuration, shown in FIG. 2B, a voltage (+V) is supplied by the first voltage source 56 such that the polar fluid 24 covers the first electrode 46 and aggregates to conform to the circle shape of the first electrode 46. In the second configuration, shown in FIG. 2C, a voltage (+V) is supplied by the second voltage source 58 such that the polar fluid 24 covers the second electrode 50 and aggregates to conform to the star shape of the second electrode 50. The non-polar fluid 26 resides in the volume of the channel 52 not otherwise occupied by the polar fluid 26. Because the channel 52 is sealed, the alternate shapes are formed by shifting the volume of polar fluid 24 in accordance with the principles described below. As will be taught, the wire mesh 54 forms a Laplace barrier that can hold the polar fluid geometry even if voltage is removed or reduced.

With reference to FIGS. 3A-3D, an electrowetting or electrofluidic device 70 according to one embodiment of the invention includes first and second substrates 42, 44, a hydrophobic layer 72 on a portion of the first substrate 42, and first and second hydrophilic layers 74a, 74b on different portions of the second substrate 44. The polar fluid 24 and non-polar fluid 26 are disposed in the channel 52. The layers 72, 74a, 74b are not electrically insulating, thin, nor porous. The first substrate 42 includes two electrodes 76, 78 that are separated by a void or space 80, which extends from the dielectric 48. The polar fluid 24 can be considered to have a direct electrical connection to a third electrode 82, which is positioned between the second substrate 44 and the first and second hydrophilic layers 74a, 74b. A hydrophobic strip 84 resides between the first hydrophilic layer 74a and the second hydrophilic layer 74b on the second substrate 44 and is substantially aligned with the space 80 between the electrodes 76, 78 of the first substrate 42. In one embodiment, the non-polar fluid 26 may be a gas such that the polar fluid 24 has a Young's angle of about 90° on the hydrophilic layers 74a, 74b and a Young's angle of about 120° on the hydrophobic layer 72.

A first voltage source 86 couples the first and third electrode 76, 82; a second voltage source 88 couples the second and third electrodes 78, 82. As shown in FIGS. 3A and 3B, in the absence of an applied voltage, the polar fluid 24 conforms to the geometrical shape of first hydrophilic layer 74a because wetting onto the hydrophobic layer 72 and the hydrophobic strip 84 would result in a larger Young's angle and a smaller radius of curvature 90. The geometry of the polar fluid 24 remains stable in the absence of the applied voltage so long as the horizontal radius of curvature 92 is not smaller than the vertical radius of curvature 90.

In FIGS. 3C and 3D, a voltage (+V) of up to a threshold voltage is applied between the second and third electrodes 78, 82 by the second voltage source 88 and results in a net pressure 96 that moves the polar fluid 24 from the first electrode 76 toward the second electrode 78. The net pressure 96 can be understood in terms of an electromechanical force, or by noticing that the radius of curvature 94 is larger than the radius of curvature 90.

As shown in FIGS. 3E and 3F, after the polar fluid 24 is moved completely onto the second electrode 78, the applied voltage (+V) from the second voltage source 88 can be removed. In the absence of applied voltage, the polar fluid 24 is held stable in the illustrated geometry, i.e., a non-circular geometry corresponding to the geometry of the second electrode 78.

In FIGS. 3A-3F, the strip 84 of hydrophobic layer 72 acts as a Laplace barrier according to one embodiment of the invention. The Laplace barrier defines a fluid pathway that is open to an advancement of the polar fluid 24 within the channel 52. The Laplace barrier regulates the polar fluid geometry, but at the same time the polar fluid 24 is easily advanced past, beyond, or through the Laplace barrier.

Figure 4A:
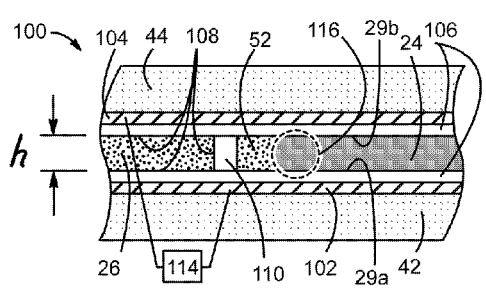
FIG. 4A is a diagrammatic cross-sectional view taken generally along line 4A-4A in FIG. 4.
Figure 4B:
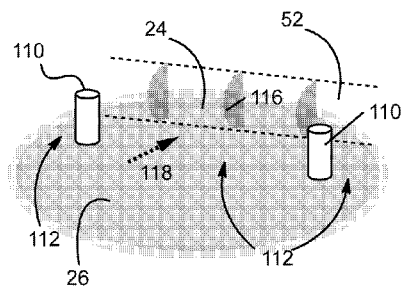
FIG. 4B is a perspective view of a portion of the device shown in FIG. 4A.
Figure 4C:
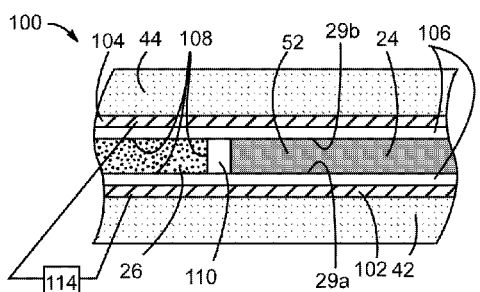
FIG. 4C is a diagrammatic cross-sectional view similar to FIG. 4A, but for an application of a voltage that inverts the vertical radius of curvature for the polar fluid.
Figure 4D:
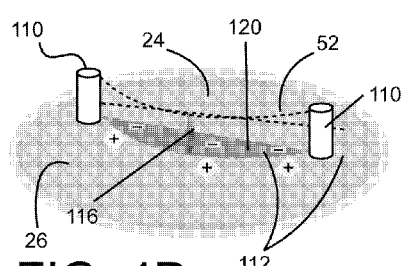
FIG. 4D is a perspective view of the device shown in FIG. 4C.
Figure 4E:
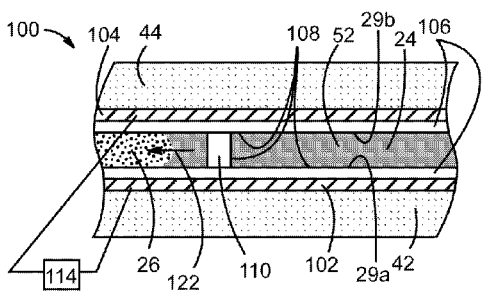
FIG. 4E is a diagrammatic cross-sectional view similar to FIGS. 4A and 4C and in which the applied voltage is increased to reduce the vertical radius of curvature of the polar fluid.
Figure 4F:
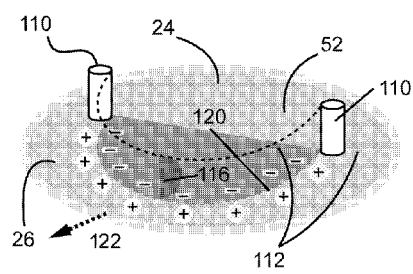
FIG. 4F is a perspective view of the device shown in FIG. 4E.

With reference to FIGS. 4-4F, a portion of another embodiment of an electrofluidic device 100 that includes functionalities that are not possible with conventional device structures. The electrofluidic device 100 includes the first and second substrates 42, 44, similar to the prior embodiments. A first electrode 102 is positioned on the first substrate 42, and a second electrode 104 is positioned on the second substrate 44. A dielectric layer 106 is placed over the first and second electrodes 102, 104, which can be covered with a hydrophobic layer 108. The electrofluidic device 100 further includes one or more hydrophobically coated spacers 110 acting as the Laplace barrier. The one or more hydrophobic spacers 110 create two or more passageways 112 (i.e., a plurality of openings) on the sides of, or between, the spacers 110. The passageways 112 collectively define the fluid pathway for the advancement of the polar fluid 24 within the channel 52. As an example only, the spacers 110 can be about 10 μm in diameter, about 10 μm in height (h), and are separated by passageways 112 that are about 50 μm wide. For example, the device 100 of FIG. 4 could therefore have a dimension of about 300 μm wide (w)×about 600 μm long (l). The polar fluid 24 can be stabilized against the spacers 110 as if the spacers 110 were a solid wall or continuous barrier. Still under appropriate operating conditions explained in detail below, the polar fluid 24 can flow in the channel 52 and through the spacers 110 as though the spacers 110 were absent, i.e. as though the only forces acting on the polar fluid 24 are due to the channel configuration.

The views of FIGS. 4A-4F do not show a full device structure, which will be later shown and described in connection with FIGS. 5A-5F. Rather, FIGS. 4A-4F are used to describe the basic physics governing the Laplace barrier created by spacers 110.

In FIGS. 4A and 4B, no voltage is supplied to the voltage source 114 connecting the first and second electrodes 102, 104, and the polar fluid 24 has a small, convex vertical radius of curvature 116. As a result, the polar fluid 24 experiences a net pressure 118 that will not allow it to advance forward, or which can cause it to retract from the shown portion of the electrodfluidic device 100. Said another way, the spacers 110, acting as Laplace barriers, restrain the polar fluid 24 to a position that is proximate to, or not exceeding, the spacers 110.

As shown in FIGS. 4C and 4D, the voltage source 114 provides a first voltage (+V) to the first and second electrodes 102, 104 that is sufficient to invert the vertical radius of curvature 116 to concave, where the first voltage is less than a threshold voltage. This will cause the polar fluid 24 to advance toward the spacers 110 (indicated by "+" and "−" indicia representing the electrical charge causing the electromechanical pressure on the polar fluid 24) in the channel 52. However, when the polar fluid 24 reaches the row of spacers 110, the spacers 110 act as the Laplace barrier by imparting a horizontal radius of curvature 120 on the meniscus of the polar fluid 24. The Laplace pressure of the polar fluid 24 will therefore equalize at zero net pressure and the radii of curvature 116 and 120 being approximately equal. This is one localized example for radii of curvatures 116, 120 and other thresholds can be realized in alternate embodiments of the present invention. Not shown, but as could be envisioned, if the meniscus of the polar fluid 24 were to try to move any further forward, then the horizontal radius of curvature 120 would be reduced, which is energetically unfavored for the device 100 presented in FIGS. 4A-4F.

Next, as shown in FIGS. 4E and 4F, the voltage source 114 can provide a second voltage (+V2) that is greater than the threshold voltage, which reduces the vertical radius of curvature 116 to the point that the polar fluid 24 will move or advance forward in the channel 52 with a net pressure 122 regardless of the horizontal radius of curvature 120 of the meniscus of the polar fluid 24. Said another way, the when the voltage source 114 provides a second voltage level (+V2) that exceeds the threshold voltage, the polar fluid 24 is unrestrained by the spacers 110 and advances to a second position that is beyond the spacers 110. Absent factors such as drag forces and wetting hysteresis, the theoretical voltage threshold for such forward movement of the polar fluid 24 is the point at which the vertical radius of curvature 116 is smaller than half the of the width of the passageway 112 between the spacers 110 comprising the Laplace barrier. Once the polar fluid 24 moves in the channel 52 beyond the Laplace barrier, the polar fluid 24 will exhibit little resistance or drag. In contrast to the advancement of a polar fluid inside a conventional, converging/diverging capillary tube or other confined channel, the polar fluid 24 will advance to surround, or encompass, the spacers 110 (i.e., Laplace barrier) at all exposed surfaces for the spacers 110. The term exposed surfaces includes all available surfaces for fluidic contact, though actual contact is not necessary for the surface to be exposed. This surrounding of the exposed surfaces of the spacers 110 is made possible by the open passageway(s) 112 within the Laplace barrier. As an example, the spacers 110 could be about 5 μm in both height and diameter, and are separated with 50 μm of separation between them. As a result, the available fluid pathway through an area containing the spacers 110 is still about 90% open as compared to the total area including the spacers 110.

The Laplace barrier acts in the manner of a porous barrier, a porous electrowetting barrier, and/or a partial barrier in that the Laplace barrier selectively permits the polar fluid 24 to advance to and past the Laplace barrier contingent upon the voltage applied to cause advancement of the polar fluid 24 within the channel 52.

In a preferred embodiment, the spacers 110 (or any other variation of Laplace barrier described herein) must provide a fluid pathway that is at least 50% open. This degree of porosity or openness may support rapid advancement of the fluids within the channel 52. At 50% open area, the fluid advancement within the channel 52 is only slowed to about 5 cm/s from the typical maximum speed of 10 cm/s. For applications such as displays, the openness of the passageway 112 may enhance optical contrast. With a pixel border that comprises 10% of the area, the contrast ratio is limited at best to 10:1 contrast if the spacers 110 are optically reflecting. Reducing the spacers 110 to 50% of the area boosts the optical contrast to a more acceptable maximum value of 20:1.

Referring again to FIGS. 4A-4F, once the advancing edge of the polar fluid 24 moves beyond the spacers 110 of the Laplace barrier, the polar fluid 24 rapidly regains a Laplace pressure that is similar to the Laplace pressure within the polar fluid 24 before it encountered the spacers 110. As a result, the polar fluid 24 is capable of continuing to flow through the Laplace barrier, using the first (lower) voltage, and with an ease similar to a channel having no spacers or barriers.

With reference to FIGS. 5A-5F, another embodiment of an electrowetting or electrofluidic device 130 is shown. The electrofluidic device 130 includes first and second substrates 42, 44. As shown, the first substrate 42 includes three separate and distinct electrodes 132, 134, 136 and a splitting electrode 138, which is described in greater detail below. A dielectric 140 covers the electrodes 132, 134, 136, 138, and a hydrophobic layer 142 covers the dielectric 140. The second substrate 44 includes an upper electrode 144 having the hydrophobic layer 142 thereon. A plurality of the spacers 110 are included within the channel 52 and surrounding the perimeter of the electrodes 132, 134, 136, 138, 144, and may be constructed in a manner that was described previously with reference to FIG. 4A-4F. As shown, some of the spacers 145 may have a different shape than those spacers 110 that surround the perimeter.

The illustrative embodiment of FIG. 5A is able to provide two or more locations for fluid positioning. Shown in FIGS. 5A and 5B, four voltage sources 146, 148, 150, 152, provide voltage between the upper electrode 144 and each of the first, second, third, and splitting electrodes 132, 134, 136, 138, respectively. The upper electrode 144 is conductive with the polar fluid 24. As a result, the polar fluid 24 partially covers the first, second, third, and upper electrodes 132, 134, 136, 144.

As is also shown and unlike conventional devices, the polar fluid 24 surrounds all exposed surfaces of the spacers 110 when moving from one display state to another. Said another way, the spacers 110 are surrounded or encompassed by the polar fluid 24.

With reference to FIGS. 5C and 5D, the electrofluidic device 130 is shown with the voltage removed from the fourth voltage source 152 associated with the splitting electrode 138. When the voltage is removed from splitting electrode 138, the vertical radius of curvature (not shown) for the meniscus of the polar fluid 24 in the channel 52 above the splitting electrode 138 will be small and convex, which causes the polar fluid 24 to dewet from the channel 52 above the splitting electrode 138. This splits the polar fluid 24 into two volumes: one volume of polar fluid 24a occupying the channel 52 above the first electrode 132 and one volume 24b occupying the channel 52 above the second electrode 134, wherein the first and second voltage sources 146, 148 are then still supplying voltage to the first and second electrodes 132, 134. If the voltages from the first and second voltage sources 146, 148 are removed from the first and second electrodes 132, 134, then the volumes of the polar fluid 24a, 24b will still reside in the position shown in FIGS. 5C and 5D because of the influence of the spacers 110 that surround the perimeter of the electrodes 132, 134, 136, 138, 144. This is because the horizontal radius of curvature 154 is greater than half the distance between adjacent spacers 110.

Next, as shown in FIGS. 5E and 5F, the volume 24b (FIG. 5C) is moved from over the second electrode 134 to over the third electrode 136 by an application of voltage from the fourth voltage source 150. When the voltage is removed, the volume 24b is stabilized by the spacers 110.

Several other alternative embodiments are possible but are not shown. For example, the two volumes 24a, 24b may be stabilized over the second and third electrodes 134, 136 without either volume touching or mixing with each other. The prevention of liquid mixing, merging, or touching is enhanced by the larger spacers 145 that form a wider Laplace barrier. The particular embodiment shown in FIGS. 5A-5F provides superior close positioning of the two volumes 24a, 24b. For example, if fluids were confined in a hexagon geometry and two hexagon confined fluids were packed immediately next to each other, then the horizontal space that could not be filled with polar fluid 24 would comprise two out of six hexagon sub-triangles or about 30% of a hexagon area. Squares can be packed with much higher density and are more compatible with most commonly used electrode formats. Such capability of packing two square shaped liquids immediately adjacent to each other, but also allowing for the rapid advancement of the polar fluid 24 from square-to-square, is uniquely enabled by the various embodiments of the Laplace barriers. Laplace barriers, as specified herein, eliminate the requirement for round or hexagon-shaped containment of polar fluids.

Also, in another alternate arrangement, and starting with the case shown in FIGS. 5C and 5D, by applying a voltage to the splitting electrode 138 via the fourth voltage source 152, the volume 24b could rejoin the volume 24a. With voltage applied to second and third electrodes 134, 136, the single volume of the polar fluid 24 could then be moved over the second and third electrodes 134, 136 and be stabilized even as these voltages are removed. Therefore, a mechanism may be provided for stabilizing the polar fluids 24 adjacent to each other, or in union with each other, both instances with any desired fluid geometry as determined by the Laplace barriers.

In the event that one spacer 110 is improperly fabricated, a second or more adjacent row(s) of spacers 110 can be provided to ensure proper Laplace barrier function. Such improvements may improve device function or improve manufacturing yield.

The electrode and dielectric arrangements shown in FIGS. 5A-5F, and all other embodiments described herein, are also not limited to the specific dielectric and electrode placements illustrated in the figures. For example, the splitting electrode 138 and the related dielectric 140 could be carried by the second substrate 44. Any arrangement is possible so long as the electrodes and the Laplace barrier function according basic electrical and fluidic principles described herein.

With further reference to FIGS. 5A-5F, the Laplace barrier can be defined mathematically as follows. The volume of the polar fluid 24 is limited such that the smallest horizontal radius curvature for the polar liquid 24 is always greater than half the width of the passageways 112 (FIG. 4) between adjacent spacers 110. This can also be specified as the polar fluid 24 having a maximum radius of curvature that is greater than a minimum radius of curvature imparted on the polar fluid 24 by the Laplace barrier. Generally, the width of the passageways 112 (FIG. 4) between adjacent spacers 110 should always be greater than the product of the height of the spacers 110 and the cosine of the minimum contact angle achieved under the applied electromechanical force.

With further reference to FIGS. 5A-5F, and all other embodiments that will be covered herein, the polar fluid 24 must be able to traverse the space between adjacent electrodes 132, 138, 134, 136. Several mechanisms are possible, all included within the spirit of the present invention. As known by those skilled in the art of electrowetting lab-on-chip, electrode interdigitation is effective at bridging the gap between adjacent electrodes 132, 138, 134, 136. Because electric field dissipates with distance and does not abruptly terminate in an insulating medium, the electrodes 132, 138, 134, 136 can also be constructed very close to one another. In some cases, providing similar or opposite polarity voltages on the electrodes 132, 138, 134, 136 may prove helpful. In other cases, the spacers 110 forming the Laplace barrier can be partly misaligned relative to the space between electrodes 132, 138, 134, 136, or staggered to provide an alternate means of polar fluid interdigitation across the space between the electrodes 132, 138, 134, 136. The polar fluid 24 can also have a volume that at least partially protrudes over the space between electrodes 132, 138, 134, 136. Numerous combinations and arrangements thereof are possible and included within the spirit of the present invention.

With further reference to FIGS. 5A-5F, the Laplace barrier is depicted as geometrically straight. Although this may be preferred for some embodiments, the Laplace barriers may also take on shapes that are more natural for the polar fluid 24, or more natural during the advancement of polar fluid 24 due to an electromechanical force. This, for example, may allow the Laplace barriers and polar fluid 24 to encounter each other simultaneously at most or all possible locations.

With reference now to FIGS. 6A-6E, electrofluidic devices according to various other embodiments of the present invention are shown utilizing alternate Laplace barriers. Generally, the devices include first and second substrates 42, 44, with the first substrate 42 having first and second electrodes 162, 164 thereon. A dielectric 166 covers the electrodes 162, 164. The second substrate 44 includes an upper electrode 168 and the dielectric 166 covering the upper electrode 168. A first voltage source 170 couples the first and upper electrodes 162, 168; a second voltage source 172 couples the second and upper electrodes 164, 168.

Figure 6A:
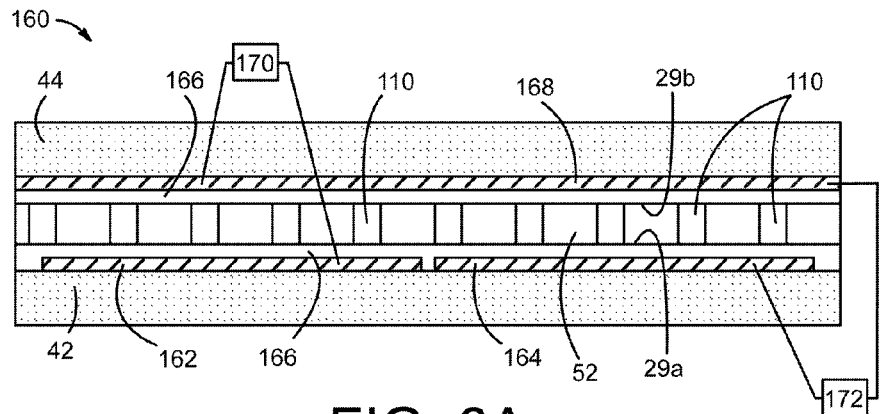
FIGS. 6A-6E are diagrammatic cross-sectional views of devices in accordance with alternative embodiments of the invention.

Shown in FIG. 6A, the spacers 110, which are constructed in a manner that is similar to those of FIG. 5A, can be arranged in an array in the channel 52. The array of spacers 110 can be a one-dimensional array, or a two-dimensional array such as a square or hexagonal pattern of spacers 110. The only change in the method by which the device 160 functions is that the threshold voltage magnitude recess to move the polar fluid 24 (FIG. 2) past the spacers 110 is the same voltage magnitude required to maintain the polar fluid 24 moving forward and covering the electrodes 162, 164. The three advantages of this approach are as follows: (1) the functionality is similar to the device 130 of FIG. 5A, but can be achieved without the need to precisely align the spacers 110 along the perimeters of the electrodes 162, 164; (2) the polar fluid 24 (FIG. 5A) could be stabilized at multiple intermediate positions between and covering the electrodes 162, 164; and (3) the separation between the spacers 110 need not be uniform. For example, though not shown, if the spacers 110 of FIG. 6A are positioned closer together over the left side of the first electrode 162 than the spacers 110 over the right side of the first electrode 162, then when the polar fluid 24 (FIG. 4A) is moved from the second electrode 164 to the first electrode 162 the final position of the polar fluid 24 (FIG. 4A) could be selectable based on the magnitude of the voltage applied from the first voltage source 170 to the first electrode 162. It would, therefore, require more voltage to move through the portion of the channel 52 having spacers 110 with less separation.

Unlike the conventional electrowetting device 10 of FIG. 1A, device 160 of FIG. 6A has spacers 110 that can provide such adaptive and robust influence over the movement and stabilization of the polar fluid 24 (FIG. 5A) with minimal displacement of the volume of the polar fluid 24 (FIG. 5A). For example, the spacers 110 could be 5 µm in both height and diameter, and separated with 50 µm separation between adjacent ones of the spacers 110 positioned in a square array. The net effect is equivalent to having one larger spacer with a cross-sectional area of $\pi \times 2.5$ µm$^2$ (about 20 µm$^2$) inside a square unit device or pixel having a cross-sectional area of 50×50 µm (2500 µm$^2$); or stated another way, the cross-sectional area occupied by the one spacer would be less than 1% of the total horizontal, cross-sectional area of the pixel. This is an advantage for situations when the particular fluid(s) are to be displayed visually or where the fluid(s) are to be moved with maximum speed and volume. This also advantageously makes more efficient use of space than the conventional electrowetting device 10 (FIG. 1A). Because the spacers 110 are often required to regulate the gap between the first and second substrates 42, 44, these spacers 110 can be simultaneously fabricated using a single photolithographic mask step. The spacers 110 can create the Laplace barrier with very little additional drag or resistance to fluid flow. Unlike hydrophilic grids or spacers used in conventional electrowetting displays, the spacers 110 do not substantially reduce electrowetting on one of two electrowetting substrates by creating low electrical capacitance on the substrates on which the spacer 110 is placed. As will be discussed for FIGS. 7A-7D, robust electrowetting on two substrates is required to introduce a fluid from a reservoir.

Figure 6B:
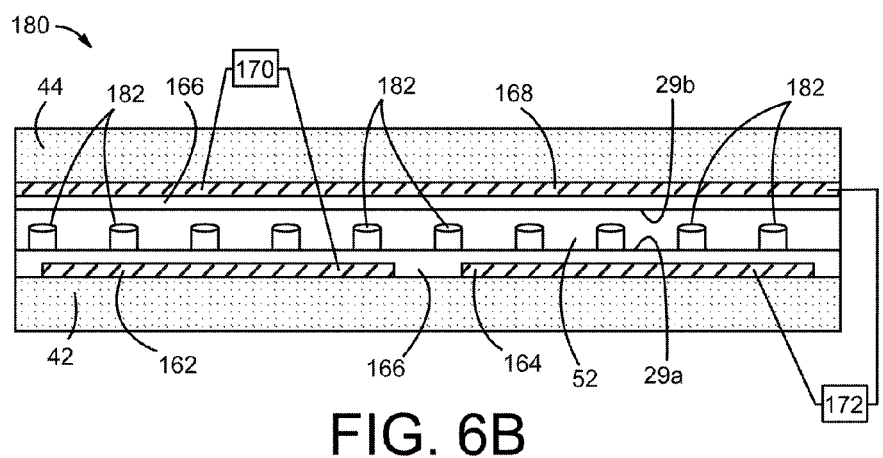
Figure 6C:
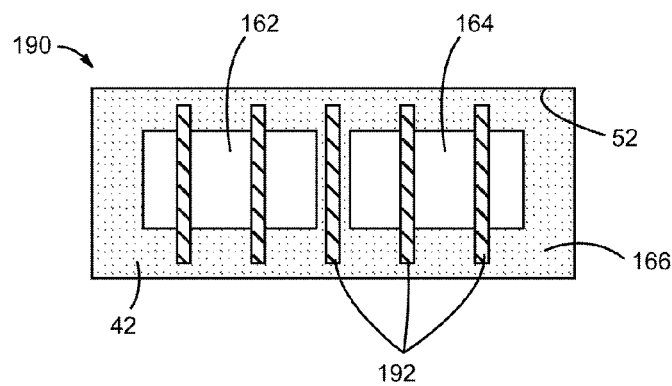

In another embodiment, shown in FIG. 6B, the Laplace barrier of the device 180 is comprised of one or more projections or posts 182 having a height that is less than the height of the channel 52. In this case, the posts 182 would not act as an actual physical spacer between the first and second substrates 42, 44, but would still function as the Laplace barrier. Because the posts 182 are shorter in height than the channel, less separation between posts 182 while maintaining a similar Laplace barrier property may promote more rapid re-merging of the polar fluid 24 after traveling through the posts 182. In some cases, the polar fluid 24 may never be split at all. Generally, to promote non-splitting of the polar fluid 24 as it moves past the posts 182, the Laplace pressure within the polar fluid 24 should favor forward movement of the polar fluid 24 over (or under as appropriate) the posts 182. While the term posts 182 may seem to connote a particular cylindrical shape, the posts 182 are not so limited. Instead, the posts 182 may include any physical structure or projection that extends into, but not entirely traversing, the channel 52. For example, in FIG. 6C, the Laplace barrier of the device 190 includes a plurality of ridges 192 having a height that is less than the height of the channel 52 and/or the posts 182 (FIG. 6B). The ridges 192 differ from the posts 182 (FIG. 6B) in that each ridge 192 can extend across a majority of one dimension of the device 190.

Figure 6D:
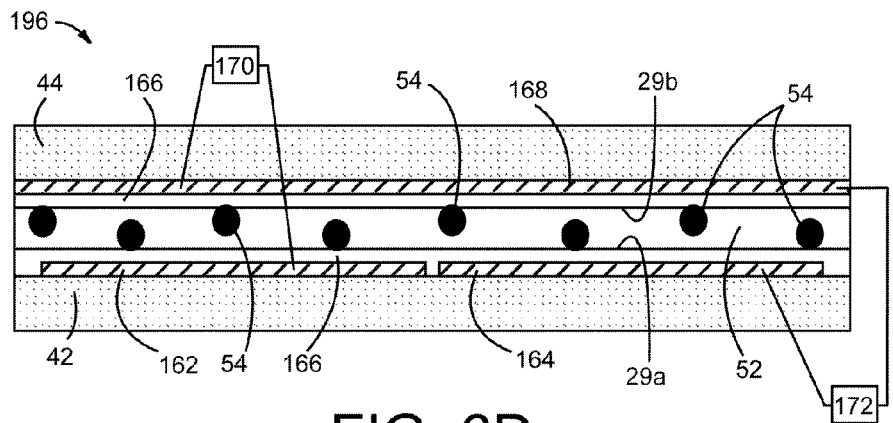

In yet another alternative embodiment of a device 196 shown in FIG. 6D, the wire or plastic mesh 54, described previously with reference to FIG. 2A replaces the spacers 110 of FIG. 6A as the Laplace barrier. If the mesh 54 is electrically conductive and coated with a very thin fluoropolymer, then the mesh 54 can also act as a localized electrical ground for the polar fluid 24 (FIG. 5A). The mesh 54 can be woven, fused, or other types of porous textiles or sheets, with the economical advantage that the mesh, textile, or sheet need simply be positioned between the first and second substrates 42, 44.

Figure 6E:
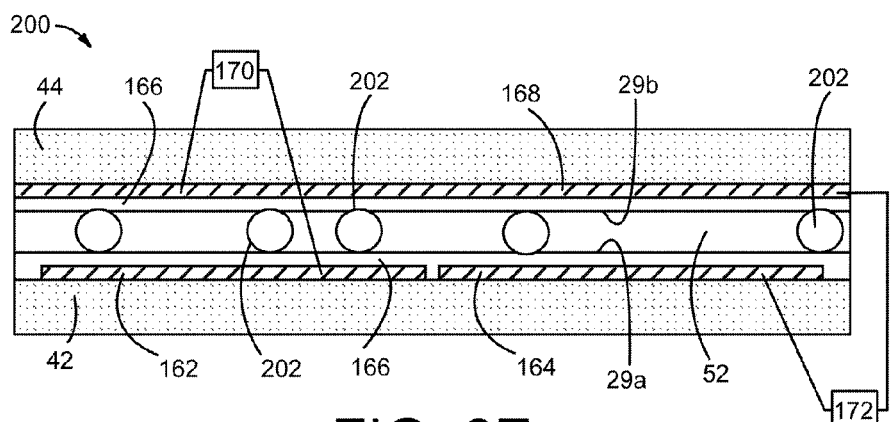

The alternative embodiment of FIG. 6E includes a device 200, having spacer spheres 202 forming the Laplace barrier, so long as the spacer spheres 202 exhibit an average separation that permits fluid flow as described for the present invention.

Unlike the spacers 110 described for FIG. 4, the mesh 54 and the spacer spheres 202 of FIGS. 6D and 6E influence a radius of curvature for the polar fluid 24 (FIG. 5A) that transverses and encompasses any acute angle for the plane of radius of curvature. Said another way, the reduced radius of curvature of the polar fluid meniscus caused by the Laplace barrier can be in a plane that is angled with respect to the vertical plane.

The specific examples shown in FIGS. 6A-6E do not form a limiting set. Rather, the examples shown in FIGS. 6A-6E illustrate that multiple variations and embodiments of Laplace barriers are included within the spirit of the present invention. Additional Laplace barriers can be partially, or fully, comprised of local charges in surface energy, surface roughness, contact angle hysteresis, and/or the height of the channel between substrates. In addition, devices with Laplace barriers can also make use of partial or porous fluid barriers, such as locally missing portions of electrodes, or locally increased dielectric thickness, that locally decrease electromechanical pressure on a polar fluid.

With further reference to FIGS. 6A-6E, and other embodiments of the present invention, the second substrate 44 need not carry the upper electrode 168, nor is there a need for a ground wire (not shown) or other electrical coupling in the channel 52. Instead, co-planar electrodes are well known to those skilled in the art of electrowetting and should be considered to be included within the spirit of the present invention. One of ordinary skill in the art would readily understand how to implement co-planar electrodes in any one of the embodiments of the invention.

With reference to FIGS. 7A-7D, an electrowetting or electrofluidic device 206 according to another embodiment of the present invention is described. The device 206 includes the first and second substrates 42, 44. A dielectric 208 is formed as a block on the first substrate 42 defines a channel portion 210 while the remaining portion of the first substrate 42 forms a reservoir 212 with the second substrate 44. The dielectric 208 includes a lower electrode 214 and a splitting electrode 216 and where the splitting electrode 216 is formed near the fluid pathway into the channel portion 210 or substantially adjacent to the reservoir 212. The second substrate 16 includes an upper electrode 218 and the dielectric 208 covering the upper electrode 218. A first voltage source 220 electrically couples the lower and upper electrodes 214, 218 with the polar fluid 24. A second voltage source 222 couples the splitting electrode 216 and the polar fluid 24. The splitting electrode 216 thus provides a means to introduce the polar fluid 24 from the hydrophobic reservoir 212 and into the channel portion 210.

Figure 7A:
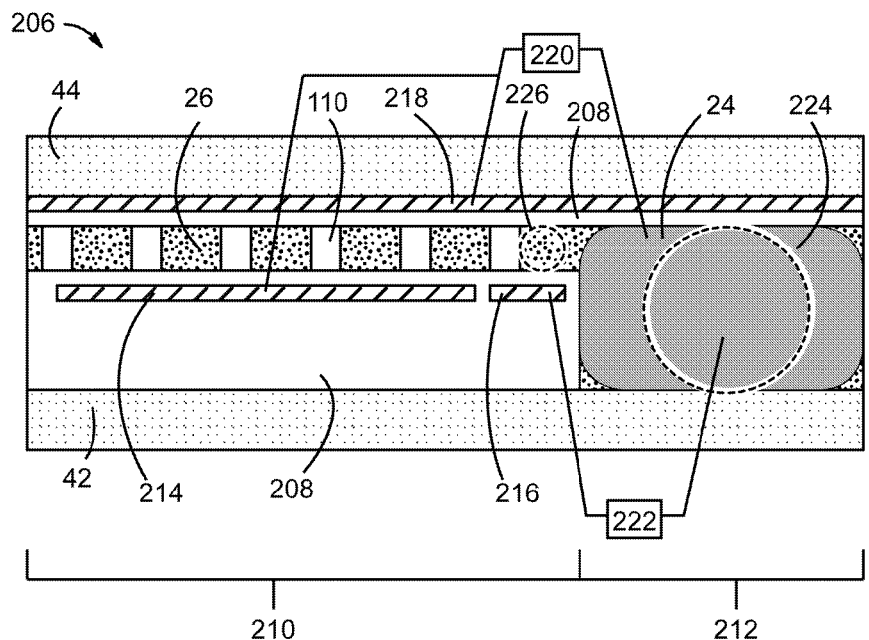
FIGS. 7A-7D are diagrammatic cross-sectional views illustrating successive steps of one exemplary method of operating of a device according to one embodiment of the invention.

With no voltage supplied from either of the first or second voltage sources 220, 222 as shown in FIG. 7A, the polar fluid 24 will favor occupation of the hydrophobic reservoir 212 over a hydrophobic channel portion 210 because the hydrophobic reservoir 212 imparts a larger radius of curvature 224 on the polar fluid 24 than the smaller radius of curvature 226 in the channel portion 210. As shown in FIG. 7A, the radii of curvatures 224, 226 cause the polar fluid 24 to recoil into the hydrophobic reservoir 212 without applied voltage. However, according the principles of the present invention, a mechanism for stabilizing the polar fluid 24 in the channel portion 210 is needed. Furthermore, once the polar fluid 24 is stabilized in the channel portion 210, it must be allowed to return to the hydrophobic reservoir 212 with appropriate electrical stimulus. Laplace barriers alone cannot achieve the functionality described above because the Laplace barrier is only functional on a polar fluid 24 that is advancing, i.e., not for retracting the polar fluid 24. For this reason, the splitting electrode 216 of device 206 of FIGS. 7A-7D is constructed as to be adjacent to the hydrophobic reservoir 212 and at least one spacer 110.

Figure 7B:
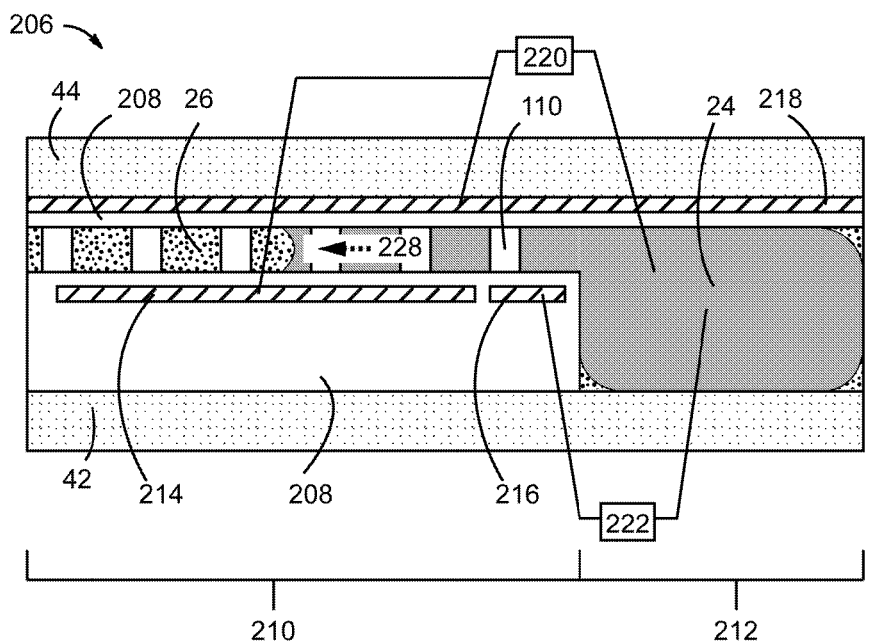

As shown in FIG. 7B, both the first and second voltage sources 220, 222 supply a voltage to the polar fluid 24 and the electrodes 214, 216, 218. As a result, a net pressure 228 is created that is sufficient to advance the polar fluid 24 into the channel portion 210 and through the spacers 110. To stop or reduce fluid advancement, the voltage applied from the first electrode 214 is reduced or stopped.

Figure 7C:
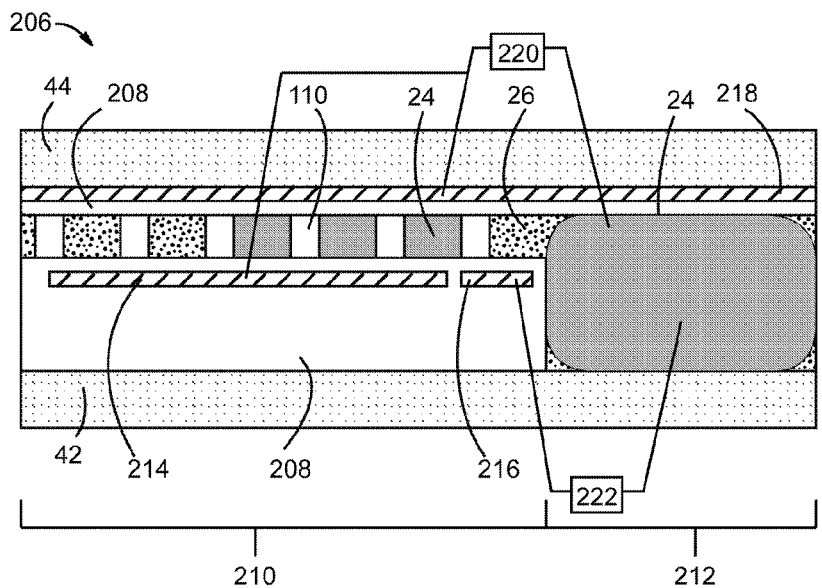

To hold the polar fluid 24 in a given or desired position, the voltage applied by the second voltage source 222 is removed or reduced on the splitting electrode 216. Accordingly, the polar fluid 24 dewets the area above splitting electrode 216 in a manner that is similar to that described with reference to FIG. 5C. The voltage supplied from the first voltage source 220 to the lower electrode 214 can also be removed and the polar fluid 24 will then be stabilized, as shown in FIG. 7C.

Figure 7D:
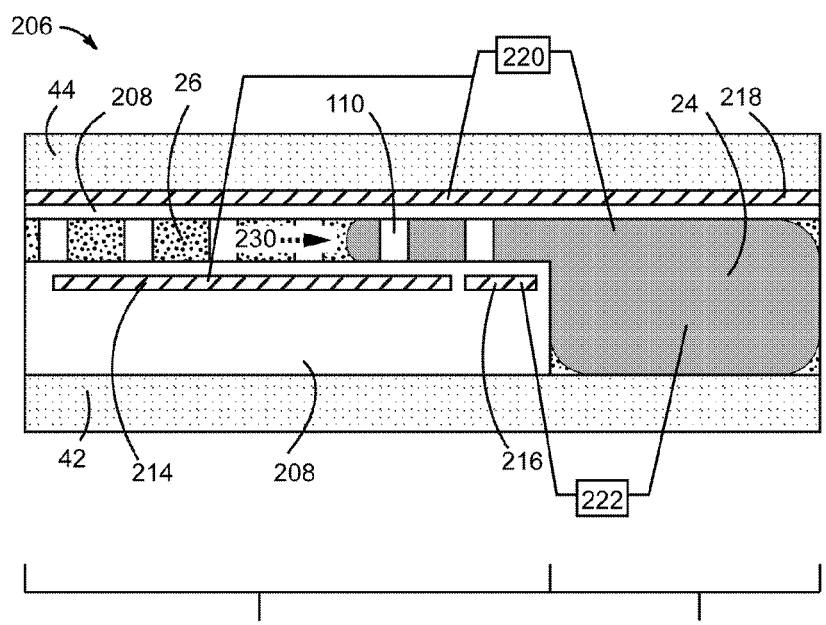

There are three features achieved by the device 206 of FIGS. 7A-7D: (1) a bistable mechanism is achieved for moving the polar fluid 24 into the channel portion 210 from the hydrophobic reservoir 212; (2) the amount of polar fluid 24 within the channel portion 210 can vary based on time or the voltage supplied from the voltage sources 220, 222; and (3) the Laplace barriers (shown as spacers 110) stabilize the polar fluid 24 such that it is always adjacent to the splitting electrode 216. As result of this third advantage, when a voltage is again applied by the second voltage source 222 to the splitting electrode 216, as shown in FIG. 7D, the polar fluid 24 can then be retracted back into the reservoir 212. A net pressure 230 is created that causes the retraction of the polar fluid 24. At the end of the process, the voltage supplied by the second voltage source 222 to the splitting electrode 216 can be removed such that the polar fluid 24 returns to the positions illustrated in FIG. 7A.

Several mechanisms are possible for improving fluid communication between adjacent electrodes, all included within the spirit of the present invention. As known by those skilled in the art of electrowetting lab-on-chip, electrode interdigitation is effective at bridging the gap between adjacent electrodes. Because electric fields dissipate with distance and do not abruptly terminate in an insulating medium, electrodes can also be constructed to be very close to one another. In some cases, providing similar or opposite polarity voltages on the adjacent electrodes may prove helpful. In other cases, the Laplace barrier can be partly misaligned relative to the space between electrodes or staggered to provide an alternate means of polar fluid interdigitation across the space between the electrodes. The polar fluid can also have a volume that at least partially protrudes over the space between electrodes. Numerous combinations and arrangements thereof are possible and included within the spirit of the present invention.

The mechanism for pulling the polar fluid 24 into the channel portion 210 from the reservoir 212, as shown in FIGS. 7A-7D, requires electrowetting onto both the first and second substrates 42, 44. Though not specifically shown, a single electrode and electrowetting surface can also be utilized to pull the polar fluid 24 into the channel portion 210. If the spacers 110 included an electrode encased by a dielectric material, then the separation between adjacent pairs of the spacers could be reduced and the spacers could electrowet and ratchet the polar fluid 24 into the channel portion 210 from the hydrophobic reservoir 212.

With further reference to FIGS. 7A-7D, the device 206 with the Laplace barrier can provide a mechanism for grayscale resets. As described previously, when the electrodes 214, 216, 218 are biased at the first voltage up to the threshold voltage, the Laplace barrier can advance the polar fluid 24 to the Laplace barrier, but not beyond it. Therefore, the device 206 may provide precise grayscale values that depend on the number of Laplace barriers included within the device 206. Accordingly, a more precise mechanism for grayscale placement of the polar fluid 24 at two or more locations is provided. It will be appreciated that a more precise mechanism is provided for the placement of the polar fluid 24 between Laplace barriers, as the polar fluid 24 is moved to the Laplace barrier and then moved a distance away from the Laplace barrier (for example, as a position that is between two adjacent Laplace barriers). This functionality can be referred to as a grayscale reset state, which avoids grayscale accumulation error over multiple switches between two or more grayscale states (i.e., positions of the polar fluid 24). Grayscale resets are usually preferred because conventionally grayscale resets had required resetting the polar fluid 24 to full filling of the channel portion 210 or the reservoir 212, which would cause an observable flicker in an information display each time the grayscale state is charged.

With reference to FIG. 8A, an electrowetting or electrofluidic device 234 is shown according to an embodiment of the present invention that includes a plurality of electrodes 236a, 236b, 236c, 236d, 236e (collectively 236n) on the first substrate 42 an upper electrode 238 on the second substrate 44. The first and second substrates 42, 44 define the channel 52. The polar and non-polar fluids 26 reside within the channel 52. The channel 52 is in fluidic communication with the reservoir 240, which may be external to the device 234. Accordingly, the portions of the first and second substrates 42, 44 adjacent the reservoir 240 include a hydrophilic coating 242a, 242b. The remainder of the first and second substrates 42, 44, and the electrodes 236n, 238 formed thereon have a dielectric 244 thereon. The hydrophilic layers 242a, 242b are electrically insulating and extend to cover a portion of the upper and first electrodes 238, 236a. In one embodiment, the hydrophilic layers 242a, 242b may be any of the previously described hydrophobic layers that was plasma or chemically treated locally to render it hydrophilic. The Laplace barrier also serves as an electrical ground with the metal wire mesh 54, which as described previously, is hydrophobically coated.

Because of the hydrophilic layers 242a, 242b, the polar fluid 24 wicks to a position within the channel 52 while remaining capable to be electrically actuated into the device 234 according the principles described for the present invention. The first electrode 236a could be, for instance, a splitting electrode, or any other electrode capable of acting as a splitting electrode.

In another embodiment, the device 246 of FIG. 8B is similar to the device 234 of FIG. 8A, but further includes a local electrical ground for the polar fluid 24, i.e., a plurality of grounding electrodes 248.

Operation of the devices 234, 246 of FIGS. 8A-8B, while not shown, is as follows. A voltage from first and second voltage sources 250, 252 is applied to the upper, first, and second electrodes 238, 236a, 236b to pull the polar fluid 24 over the first and second electrodes 236a, 236b. The first electrode 236a of the plurality of electrodes 236n is then no longer provided with voltage from the second voltage source 252 and the polar fluid 24 splits into two volumes: the first volume is connected to the original volume of polar fluid 24 within the reservoir 240 and the second volume extends over the second electrode 236b. The volume of the polar fluid 24 over the second electrode 236b can be moved by applying a voltage by a third voltage source 254 between the third electrode 236c and any of the other electrodes 236d, 236e. A larger volume of the polar fluid 24, spanning two or more electrodes, can also be created and moved as described above with reference to FIGS. 7A-7D. One advantage of using a localized electrical ground in the form of metal wire mesh 54 (FIG. 8A) or the grounding electrode 248 (FIG. 8B) is that the polar fluid 24 is not influenced by voltages that are applied to adjacent volumes of polar fluid. Such advantage is readily understood by those skilled in the art of passive matrix electrode addressing.

Figure 9:
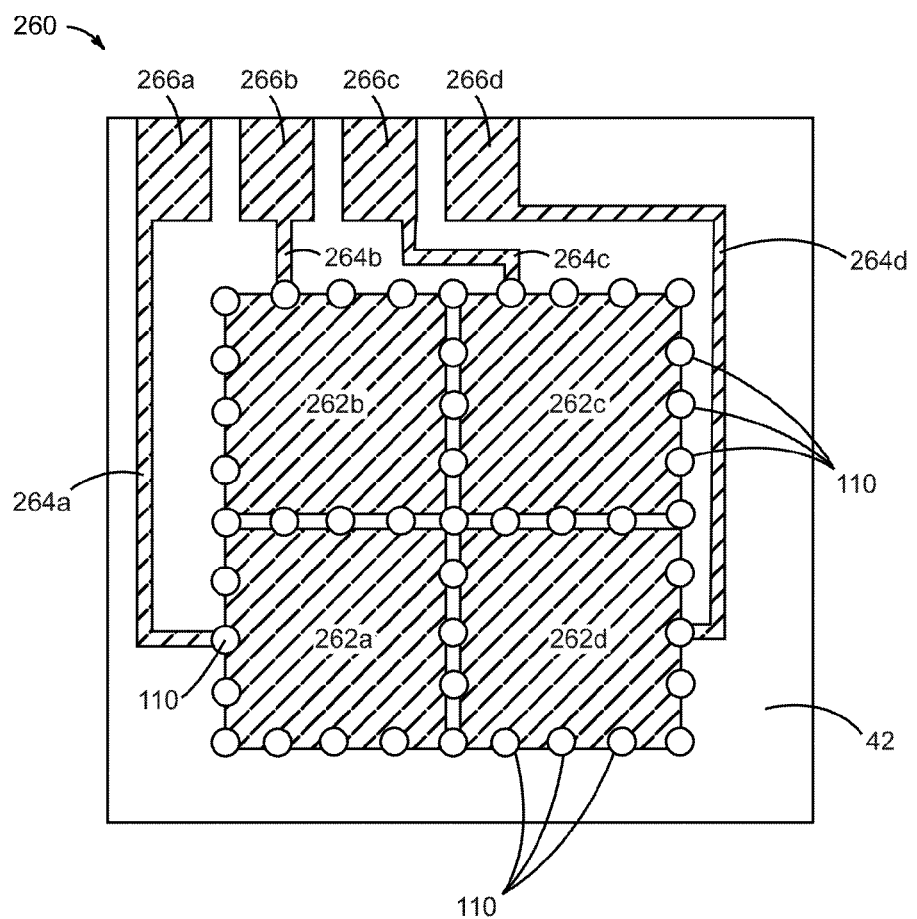
FIG. 9 is a diagrammatic cross-sectional view of a device with segmented electrodes, according to an embodiment of the present invention.

With reference to FIG. 9, an electrowetting or electrofluidic device 260 according to an embodiment of the present invention is described. The first substrate 42 is shown and includes segmented electrodes 262a, 262b, 262c, 262d (collectively 262n) in the representative form of square electrode pads, to move the polar fluid 24 (FIG. 3A) over two or more of the segmented electrodes 262n. The second substrate 44 (FIG. 3A) would be included to form the channel 52 with the first substrate 42; however, the second substrate 44 (FIG. 3A) is not shown for simplicity in this cross-section through the channel 52. Generally, the segmented electrode layout requires a plurality of electrode lines 264a, 264b, 264c, 264d (collectively 264n) to electrode pads 266a, 266b, 266c, 266d at the edge of the first substrate 42. Alternatively, though not shown, an electrode via may extend through the first substrate 42 in a manner that is similar to that used in printed circuit boards. In the representative embodiment, the electrode lines 264n terminate near the first substrate edge and are respectively connected with the electrodes 262n, in a one-to-one fashion. For the case where the electrodes 262n are all carried on the same substrate, spacers 110 may be placed at each location where the electrode line 264n connects with the respective segmented electrode 262n. This structure prevents the polar fluid 24 (FIG. 3A) from being electromechanically and prematurely pulled onto the electrode line 264n. In an alternate approach, though not specifically shown, is to implement an electrode line that is horizontally narrow, such that the effective electrode line area is insufficient to pull polar fluid 24 (FIG. 3A) onto the electrode line.

With reference now to FIGS. 10A and 10B, an electrowetting or electrofluidic device 270 according to another embodiment of the present invention is shown. Again, the electrofluidic device 270 includes first and second substrates 42, 44 forming the channel 52 there between. The first substrate 42 includes three lower electrodes 272, 274, 276 and a dielectric 278 covering the first substrate 42 and the electrodes 272, 274, 276. The second substrate 44 includes three upper electrodes 280, 282, 284 with the dielectric 278 thereon. The upper electrodes 280, 282, 284 are positioned to be orthogonal to the lower electrodes 272, 274, 276 of the first substrate 42 so as to form a grid-like pattern of rows (the upper electrodes 280, 282, 284 of the second substrate 44) and columns (the lower electrodes 272, 274, 276 of the first substrate 42), shown in FIG. 10B. This arrangement of upper and lower electrodes 272, 274, 276, 280, 282, 284, creates a so-called passive matrix electrode operable to move the polar fluid 24 (FIG. 3A) between multiple locations. While one of ordinary skill in the art would readily understand the implementation of passive matrix electrodes, the device 270 has been illustrated as having a generic voltage source 283 representing a different voltage source that is electrically coupled to a separate one of the upper and lower electrodes 272, 274, 276, 280, 282, 284.

The electrofluidic device 270 moves the polar fluid 24 (FIG. 3A) horizontally between multiple locations to switch the polar fluid 24 (FIG. 3A) in a bistable pixel between two visibly different states. For example, if the polar fluid 24 (FIG. 3A) were to simultaneously cover more than one row or column electrode, then capacitance coupling between the covered electrodes through the polar fluid 24 (FIG. 3A), could complicate the drive scheme. Accordingly, the wire mesh 54, acting as the Laplace barrier if metallic, can function as an electrical grounding electrode for the polar fluid 24 (FIG. 3A) at all locations. Then, the wire mesh 54 can be designed such that electrowetting on the first and second substrates 42, 44 must be provided simultaneously to advance the polar fluid 24 (FIG. 3A) through the wire mesh 54. As a result, the polar fluid 24 (FIG. 3A) will only move toward an adjacent row and/or column electrode that is provided with an appropriate voltage. This aspect of this embodiment of the present invention provides a simple means for passive matrix electrical control of polar fluid movement.

Figure 11A:
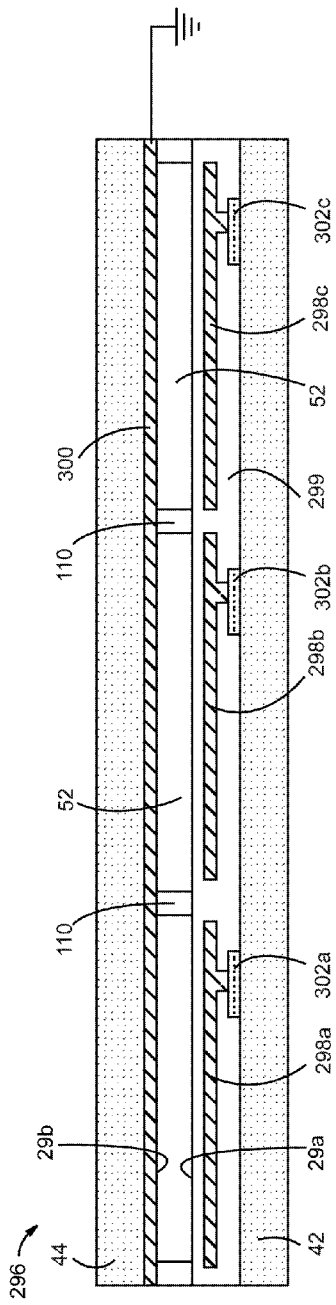
FIG. 11A is a diagrammatic cross-sectional view of a device in accordance with yet another embodiment of the invention.
Figure 11B:
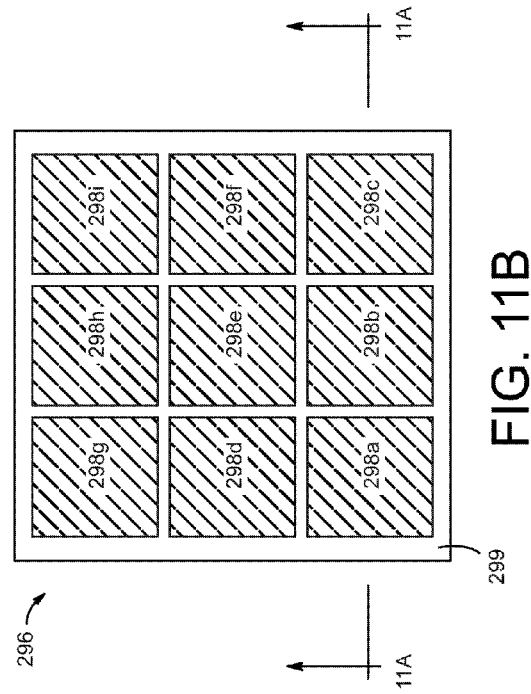
FIG. 11B is a top view of the device shown in FIG. 11A.

With reference to FIGS. 11A and 11B, an electrowetting or electrofluidic device 296 according to yet another embodiment of the present invention may be described. The electrofluidic device 296 is constructed with an active matrix electrode scheme, i.e., the first substrate 42 includes a plurality of electrodes 298$n$ (where n ranges from a to n in the illustrative embodiment) arranged in a matrix-like pattern and covered by a dielectric 299. The second substrate 44 includes a grounding electrode 300 thereon and cooperates with the first substrate 42 to form the channel 52 there between for containing the polar fluid 24 and non-polar fluid 26 (FIG. 3A). The active electrode scheme can move the polar fluid 24 (FIG. 3A) between multiple locations that are defined by each of the electrodes 298$n$. A thin-film transistor 302$n$ for each electrode 298$n$ provides local voltage control of each of the electrodes 298$n$ and thus controls electrowetting of the polar fluid 24 (FIG. 3A) onto that electrode 298$n$. Alternately, the thin-film transistors 302$n$ can provide voltage directly to the polar fluid 24 (FIG. 3A). In either case, as the polar fluid 24 (FIG. 3A) moves between the electrode 298$n$, the electrical capacitance between the polar fluid 24 (FIG. 3A) and the electrode 298$n$ varies. In active matrix drive, discharging the capacitance between the polar fluid 24 (FIG. 3A) and the electrode 298$n$ is easily achieved even if the capacitance is variable. However, building up the capacitance between the polar fluid 24 (FIG. 3A) and the electrode 298$n$ to advance the polar fluid 24 (FIG. 3A) over the electrode 298$n$ presents a challenge because the capacitance between the electrode 298$n$ and the polar fluid 24 (FIG. 3A) increases as the polar fluid 24 (FIG. 3A) advances above that electrode 298$n$. During a typical write-time in active matrix drive, the polar fluid 24 (FIG. 3A) advances too slowly over the electrode 298$n$ to allow the capacitance to maximize. As a result, multiple row voltage write cycles for the thin-film transistor 302$n$ are required to complete polar fluid movement. Therefore, arrangements of storage capacitors, or arrangements of multiple thin-film transistors 302$n$ may be preferred to promote rapid movement of the polar fluid 24 (FIG. 3A). A variety of such electrical drive schemes are well-known by those skilled in the art of active matrix displays and included within the spirit of the present invention.

With reference now to FIGS. 12A and 12B, an electrowetting or electrofluidic device 310 according to an embodiment of the present invention that is capable of utilizing an optically addressed virtual electrode scheme is described. The device 310 includes the first substrate 42 having a first electrode 312, a dielectric 314, and a photoconductor 316 positioned between the first electrode 312 and the dielectric 314. The second substrate 44 has a second electrode 318 thereon, and, with the first substrate 42, defines the channel 52. In the absence of light from the light source 60, the photoconductor 316 acts as a low-capacitance dielectric; in the presence of light from the light source 60, the photoconductor 316 acts as an electrical conductor. Therefore, the polar fluid 24 (FIG. 3A) may be moved in the device 310 by providing an AC voltage between the first and second electrodes 312, 318, and illuminating the photoconductor 316 with light adjacent to a volume of polar fluid 24 (FIG. 3A). The light generated by the photoconductor 316 will cause a voltage drop across the dielectric 314, but not the low-capacitance photoconductor 316 and, as a result, will locally increase the electrowetting effect. The polar fluid 24 (FIG. 3A) then moves to optically illuminated areas according to principles described herein for the present invention. Various optically address techniques are possible, such as those used for optical electrowetting or optical dielectrophoresis and are included within the spirit of the present invention. The photoconductor 316 can also be placed in other locations, for example, covering the second electrode 318 on the second substrate 44 in order to locally control an electrical connection with the polar fluid 24 (FIG. 3A). The device 310 can implement additional Laplace barriers as previously described for FIGS. 6A-6E.

Figure 13A:
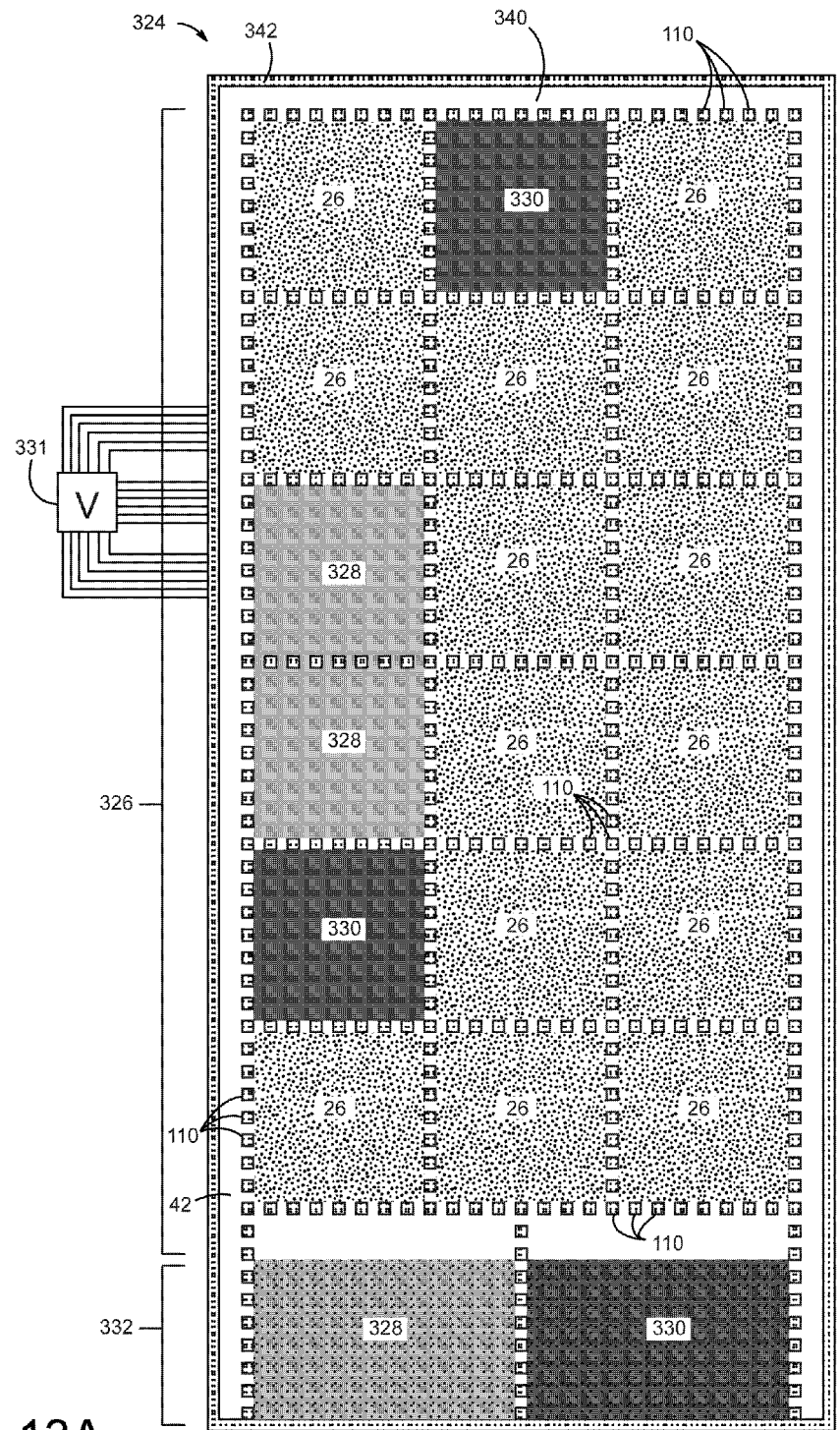
FIGS. 13A-13B are diagrammatic cross-sectional views of a device that may be useful for information display applications according to another embodiment of the invention.
Figure 13B:
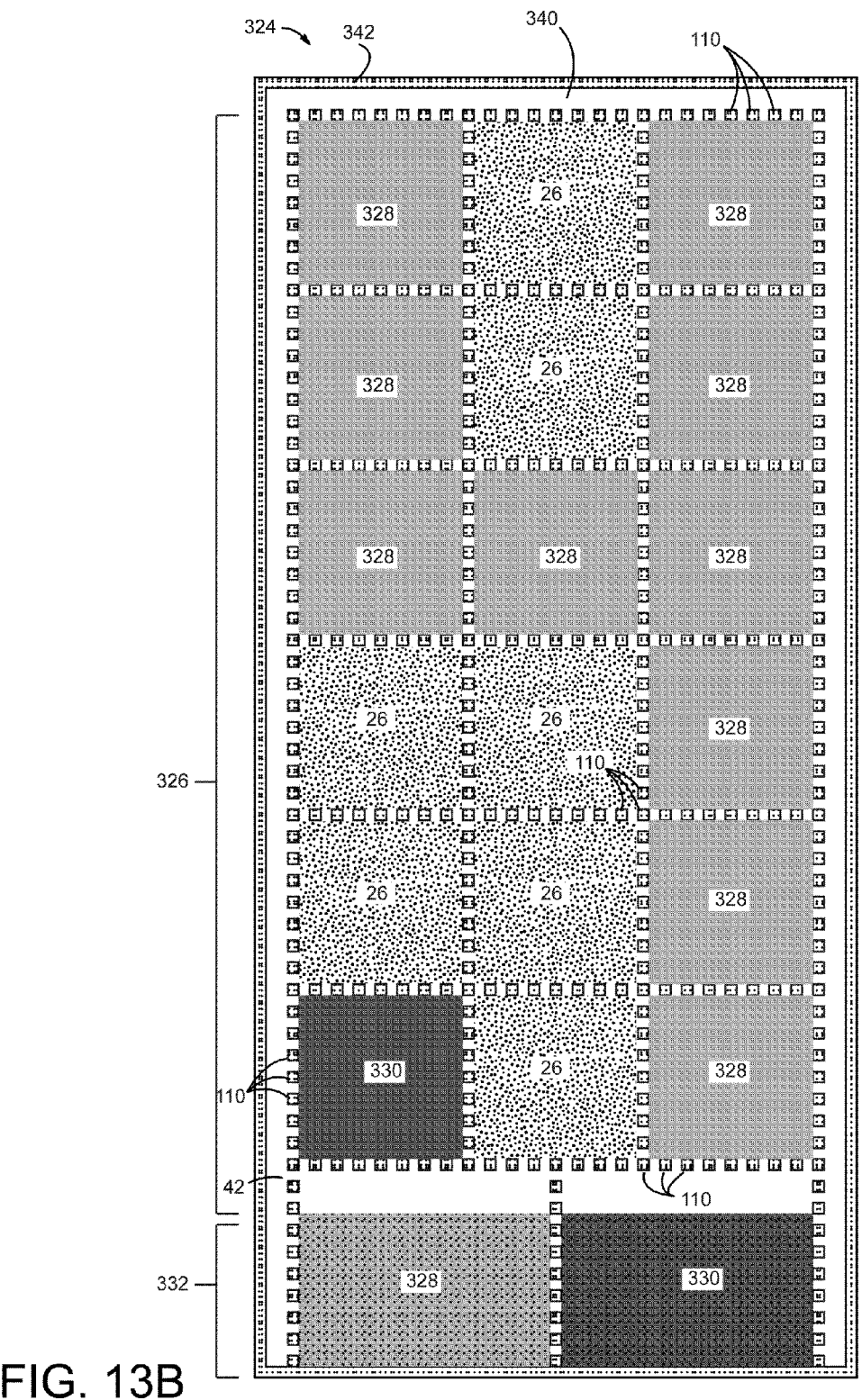

Referring now to FIGS. 13A and 13B, an embodiment of the present invention is described where the Laplace barrier, illustrated here as a plurality of spacers 110, can be used within an electrofluidic display 324 that is capable of alphanumeric or symbolic representations of reconfigurable information display beyond a simple ON/OFF indicator or multi-position electrowetting pixel. A channel portion 326 includes a matrix of pixels between the first and second substrates 42, 44, the latter of which is not shown due to the selection of the cross-sectional view. The non-polar fluid 26 and at least two polar fluids 328, 330 are constrained between the first and second substrates 42, 44. The polar fluids 328, 330 differ in at least one optical or spectral property. Each pixel is delineated by the plurality of spacers 110 acting as the Laplace barriers, and each pixel is capable of receiving and holding one of the fluids 26, 328, 330 in a tight, square geometry. The polar fluids 328, 330 will be drawn as squares in each channel for simplicity, and because visually to an observer, the actual polar fluid geometry can be quite close to a square, i.e., fill more than 95% of the square geometry is possible.

The electrofluidic display 324 also includes a reservoir region 332 for holding sufficient volumes of the polar fluids 328, 330 to fill a majority or all of the pixels. Such a reservoir region 332 is not required as the polar fluids 328, 330 could be simply stored in additional pixels or another external channel (not shown); however, the reservoir region 332 will reduce the visible area of fluid storage and is generally preferred. The polar fluids 328, 330, can be introduced into a pixel that is adjacent to the reservoir region 332 using one or more of the techniques described above with reference to FIGS. 7A-7D and/or 8A-8B. Once one of polar fluids 328, 330 is in the adjacent pixel, it is free from the reservoir region 332 and only one electrowetting surface is needed to move the polar fluid 328, 330 to another pixel. However, two electrowetting surfaces may also be implemented.

When the non-polar fluid 26 fills all of the pixels, the electrofluidic display 324 might, for example, exhibit a blank white reflectance, or some other color, including black. One of ordinary skill in the art would readily understand that specific reflector designs, which are not discussed in detail herein, can be located at multiple possible regions in the electrofluidic display 324 and are well understood by those skilled in the art of displays. The electrofluidic display 324 may also be transparent when the non-polar fluid 26 is in the pixel, so long as some visual change occurs with movement of one or both of the polar fluids 328, 330. In addition, the spacers 110 may be constructed from a clear, reflective, or colored material such that they compliment, add, subtract, or otherwise modify the visual appearance of the electrofluidic display 324. For example, the spacers 110 can be formed from SU-8 epoxy that has been dyed black or containing a pigment such as Perylene black.

With continued reference to FIG. 13A, the polar fluids 328, 330 have been moved into the pixels to illustrate that two different polar fluids 328, 330 can be situated in adjacent pixels without the risk of mixing or merging. In addition, a single volume of the first polar fluid 328 spans adjacent pixels. Therefore, multiple and alternate arrangements are possible.

With reference to FIG. 13B, the polar fluids 328, 330 have been moved into select pixels so as to form an alphanumeric representation of '0.4'. As shown, the '.' is displayed in a first color (use of the second polar fluid 330) that is different from the '4' (use of the first polar fluid 328). As described previously, even if polar fluids 328, 330 are in adjacent pixels, they do not mix by virtue of the spacers 110.

In a preferred embodiment, the spacers 110 should comprise less than 20% of the total area projected onto the plane that is occupied by the polar and non-polar fluids 328, 330, 26. Otherwise, the contrast ratio of the electrofluidic display 324 will be substantially sacrificed. Also, for alphanumeric character display, the spacers 110 should be optically non-obvious such that the character resembles its printed counterpart.

The polar fluids 328, 330 move between pixels as follows. In a first instance, one of the polar fluids 328, 330 moves easily into a single pixel that contains only the non-polar fluid 26. In another instance, one of the polar fluids 328, 330 moves into a pixel that already contains the other polar fluid 330, 328. In some embodiments, both polar fluids 328, 330 may move simultaneously (one moving into the pixel as the other moves out). This latter arrangement requires more than one electrode, i.e., one associated with each pixel. While one of ordinary skill in the art would understand that each electrode would include a separate voltage source, for simplicity, only a single generic voltage source 331 is shown to represent an electrical connection to each electrode associated with the 18 pixels. However, this arrangement poses the risk of fluid merging, which must be mitigated by advanced pixel design. A simpler but slower alternative has one polar fluid 328, 330 moving completely or mostly out of the pixel before the other polar fluid 330, 328 moves in. For embodiments where the polar fluids 328, 330 are of the same color, fluid merging might be tolerated.

In order to reconfigure the image in the electrofluidic display 324 in FIG. 13B, mathematical algorithms such as those developed for sliding tile puzzles may be implemented. All pixels may be filled with either of the polar fluids 328, 330 so long as the last non-filled pixel is adjacent to the reservoir region 332, which will then fill the last non-filled pixel. Most applications will likely reset the polar fluids 328, 330 to the reservoir region 332 before creating the new image one row of pixels at a time. Assuming 10 cm/s speed of polar fluid motion, a 1" high and 75 dots per inch ("DPI"), electrofluidic display 324 could create an image in roughly 1 second. Such speed is fully adequate for many applications, such as electronic shelf labels for retail products.

For the electrofluidic display 324 of FIGS. 13A-13B, it should be noted that a space 340 surrounds the matrix of pixels and is enclosed by an enclosing barrier 342, i.e., another Laplace barrier. Although not mandatory, the space 340, or otherwise referred to as a duct, will allow the non-polar fluid 26 to rapidly flow back to the reservoir region 332, or to an adjacent pixel, as the polar fluids 328, 330 move from the reservoir region 332 to the pixels or between pixels. In fact, the entire array is 'open-cell' such that the pixel can be open to the non-polar fluid flow on three sides as the polar fluid 328, 330 moves into that pixel. This feature is inherent to the design (i.e., comes without additional complexity or manufacturing cost). Although for all embodiments, it is preferred that the non-polar fluid 26 is an oil, the non-polar fluid 26 may also be a gas. In such cases, enclosing barrier 342 may be replaced with a series of holes that operate as a wetting barrier (due to a locally diverging capillary affect). For all embodiments shown herein, the geometry or array size of the electrofluidic display 324 can be modified to serve applications ranging from simple indicators on a USB flash drive, an e-book, or even billboard electronic signage.

The embodiments described herein are not limited to the specific illustrative Laplace barrier geometries. The present invention extends to using Laplace barriers that can comprise a continuous wall or perimeter on or between electrodes, having a height that does not span the entire channel. Laplace barriers may also be of varying heights that partially or completely span the channel. Some Laplace barriers may reside on the top substrate, some on the bottom substrate. Laplace barriers can take on multiple physical geometries (round, square, polygon, curved, etc. . . . ), locations, and arrangements, so long as they provide the Laplace barrier function within the spirit of the present invention.

The embodiments described herein are not limited to electrowetting control. The present invention extends to using the Laplace barriers and electrofluidic methods including electrowetting without insulators, syringe-pumps, thermocapillary, photo-responsive molecules such as spiropyrans, dielectrophoresis, electrophoresis, and micro-electro-mechanical pumping. For example, one skilled in the art of in-plane electrophoresis will recognize that the spacer posts embodiment of the Laplace barrier could also be coated with a surface charge, similar to how electrical charges are provided to pigments in electrophoretic or other types of dispersions. As a result, the Laplace barrier could be created where it would require a first voltage to move electrophoretic pigment in an insulating fluid to the Laplace barrier, but not beyond it, because of like repulsion of the pigment charge and the surface charge on the Laplace barrier. Next, a second and greater voltage could be provided to move the charged pigment beyond the Laplace barrier. As a result, a truly bistable and multi-position in-plane electrophoretic device is created.

EXAMPLE 1

In a first example illustrated as scanning electron microscope images in FIGS. 14A-14E, the fabrication of a device 346 is shown. The device 346 includes a glass wafer substrate having an array of spacer posts 348 fabricated thereon. To create the array of spacer posts 348, a newly available negative-acting dry film photoresist DuPont PerMX-3020 (20 μm thick) was laminated at 80° C. and 40 psi onto the glass wafer using a Western Magnum dry film laminator. The photoresist was then UV exposed with the post-pattern, puddle developed in propylene glycol monomethyl ether acetate, and hard baked at 150° C. for 30 min. Approximately 150 nm of copper (Cu) was sputtered onto the posts 348 and the substrate to create the bottom electrode. For simplicity the substrate and electrode are represented by the surface 352. About 1 μm of Parylene C dielectric was then conformally deposited onto the Cu using a Specialty Coating Systems PDS2010 system. The spacer posts 348 were then dip-coated in Cytonix Fluoropel 1601V solution and then baked at 120° C. for 20 min. to obtain a hydrophobic fluoropolymer layer of about 50 nm.

The device 346 was covered with a top substrate (not shown in the figures) of $In_2O_3$:$SnO_2$ and 50 nm of Fluoropel 1601V.

The device 346 was then dosed with tested fluids that included a 0.1 wt % NaCl aqueous polar fluid 327 that additionally included a self-dispersing pigment for coloration, and a tetradecane non-polar fluid 350 containing Dow Corning Triton X-15 (a surfactant).

In the first set of experiments, the spacer posts 348 were arranged in a uniform array, which included a single large area Cu electrode. Although this testing setup cannot provide programmable movement of the polar fluid 327, it did confirm that closely spaced spacer posts 348 can cause forward propagation with one electrowetting plate and stabilization of polar fluid geometry once a voltage from voltage source (not shown) is removed. The threshold voltage for polar fluid propagation was 55V, and could be lower with use of higher capacitance dielectric coatings.

Several rows and splits of paired spacer posts 348 were also fabricated, tested at 55V, and time-lapse images are shown in FIGS. 14C and 14D. It would be understood that the areas not designated as polar fluid 327 would include the non-polar fluid 329. These experiments demonstrate the preliminary basis for directional flow and channel splitting. Experiments were also performed (not shown) with differently colored aqueous solutions at opposite ends of virtual electrowetting channels and liquid mixing was confirmed. All images provided herein have been processed by the stylized find-edges and contrast-enhance functions of Adobe® Photoshop® of Adobe Systems, Inc. (San Jose, Calif.).

EXAMPLE 2

Figure 14F:
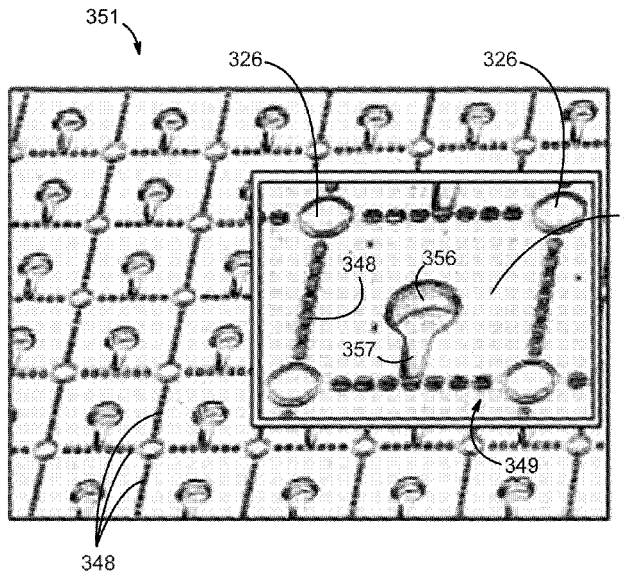
Figure 14G:
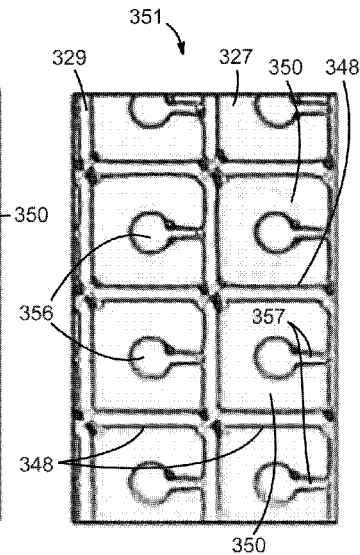

In the next example, shown as scanning electron microscope images in FIGS. 14F-14G, a perimeter of small diameter spacer posts 348 and larger diameter corner spacer posts 326 were implemented around a display pixel 349 having dimension of about 300 µm×300 µm. A plurality of pixels 349 comprises a device 351, where each pixel 349 is separated by the perimeter of posts 348, 326. Each pixel 349 includes a channel positioned above an electrode, both represented by a surface 350. A reservoir 356 and duct 357 are formed into each surface 350.

The fluids consisted of a polar fluid 327 containing a red dispersed pigment and a black non-polar fluid 329 containing several dye mixtures. When voltage from a voltage supply (not shown) was applied to the electrodes (designated by surface 350), the polar fluid 327 was pulled out of the reservoir 356 and filled the channel (designated by surface 350). However, the polar fluid does not propagate beyond the pixel perimeter because of the spacer posts 348.

EXAMPLE 3

Figure 14H:
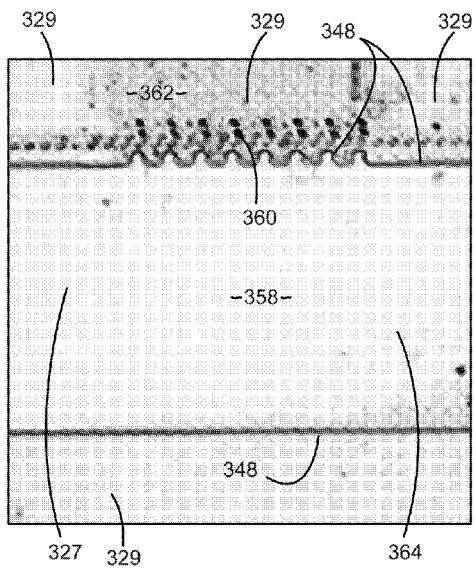
Figure 14I:
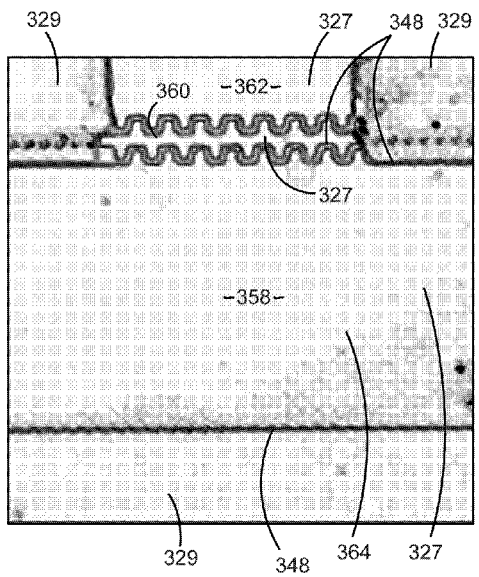

Another example, illustrated as scanning electron microscope images in FIGS. 14H and 14I, include a glass substrate 364 having first, second, and third Aluminum electrodes 358, 360, 362. The electrodes 358, 360, 362 were coated with 2.5 µm of a SU-8 epoxy dielectric and then patterned with the posts 348, which were about 5 µm high and about 50 µm in pitch. The posts 348 were coated with 50 nm of a fluorpolymer. A top substrate, not shown in the figures, was added and the device was dosed with polar 327 and non-polar 329 fluids. The non-polar fluid 329 included a black dye such that when it covered one of the electrodes 358, 360, 362, the electrode 358, 360, 362 was not visible in the photograph In FIG. 14H, the polar fluid 327 was electrowetted with a first voltage to cover the first electrode 358; however, the posts 348 between the first and second electrodes 358, 360 confined the polar fluid 327 to the first electrode 358.

When a second and greater voltage was applied from a voltage source (not shown) to all electrodes 358, 360, 362, the polar fluid 327 advanced through the posts 348 such that polar fluid 327 covered all electrodes 358, 360, 362. When this voltage was removed, the polar fluid 327 retained the geometry shown in FIG. 14I. Electrode 360 was also shown to act as a splitting electrode according to the principles of the present invention.

EXAMPLE 4

In the next example, though not shown, the spacer posts were replaced with a woven wire mesh that was sandwiched between first and second electrowetting plates. The mesh was comprised of 30 µm wire diameter mesh, which at the overlap between wire threads was therefore 60 µm in total thickness and was made hydrophobic with a fluoropolymer coating. The mesh was purchased from TWP Inc., was woven to ISO 9044, and was a 50 mesh count (per inch). It was found that the wire mesh allowed polar fluid movement by electrowetting, but also was able to regulate the polar fluid geometry in the absence of voltage. Therefore the wire mesh was also shown to act as a Laplace barrier.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composing," or variants thereof are used in either the detailed description or the claims, such terms are intended to be inclusive in a manner similar to the open-ended term "comprising."

While the invention has been illustrated by a description of various embodiments and while these embodiments have been described in considerable detail, it is not the intention of the applicants to restrict, or in any way limit, the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of the general inventive concept.

What is claimed is:

1. A device comprising:
   a first polar fluid;
   a non-polar fluid;
   a first substrate;
   a second substrate arranged relative to the first substrate to define a hydrophobic channel containing the first polar fluid and the non-polar fluid;
   a first electrode on the first substrate;
   a dielectric layer between the first electrode and the first polar fluid;
   a first Laplace barrier within the hydrophobic channel, the first Laplace barrier defining a fluid pathway open to movement of the first polar fluid within the hydrophobic channel; and
   a first voltage source electrically connected with the first electrode, the first voltage source configured to electrically bias the first electrode to cause the first polar fluid to move within the hydrophobic channel relative to the first Laplace barrier,
   wherein the first polar fluid is moved to a first position within the hydrophobic channel when the first electrode is biased by the first voltage source with a first voltage that is less than or equal to a threshold voltage, and the first polar fluid moves from the first position to a second position within the hydrophobic channel when the first electrode is biased by the first voltage source with a second voltage that is greater than the threshold voltage, and wherein the first Laplace barrier includes one or more hydrophobic spacers dividing the fluid pathway into a plurality of openings each at least partially occupied by the first polar fluid at the second position.

2. The device of claim 1, wherein the first Laplace barrier restrains the first polar fluid at the first position when the first electrode is biased with the first voltage.

3. The device of claim 1, wherein the first Laplace barrier includes a plurality of hydrophobic spacers extending between the first and second substrates and the plurality of hydrophobic spacers is arranged with a spacing that is sufficient to impart a radius of curvature to a meniscus of the first polar fluid.

4. The device of claim 3, wherein each of the plurality of hydrophobic spacers has a height, and adjacent ones of the plurality of hydrophobic spacers are separated by a distance that is greater than a product of the height of each of the plurality of hydrophobic spacers and a cosine of the contact angle of the first polar fluid when the first electrode is biased with the second voltage.

5. The device of claim 1, wherein the first Laplace barrier includes at least one projection that protrudes into the hydrophobic channel, and the at least one projection imparts a radius of curvature on a meniscus of the first polar fluid.

6. The device of claim 1, wherein the hydrophobic channel has a first cross-sectional area at a location that includes the first Laplace barrier, and the fluid pathway has a second cross-sectional area at the location that includes the first Laplace barrier that is at least 50% of the sum of the first and second cross-sectional areas.

7. The device of claim 1, wherein the hydrophobic channel includes a first surface characterized by a first hydrophobicity and a second surface characterized by a second hydrophobicity that is greater than the first hydrophobicity, the second surface imparting a higher Laplace pressure on the first polar fluid than the first surface such that the second surface operates as the first Laplace barrier.

8. The device of claim 1, wherein, when the first electrode is unbiased, the first polar fluid has a maximum radius of curvature that is greater than a minimum radius of curvature imparted on the first polar fluid by the first Laplace barrier.

9. The device of claim 1, wherein the first Laplace barrier is bounded by an exposed surface, and the first polar fluid surrounds the exposed surface of the first Laplace barrier when the first polar fluid is in the second position and the first electrode is unbiased.

10. The device of claim 1 further comprising:
a second Laplace barrier in the hydrophobic channel and spaced from the first Laplace barrier, and the second voltage is sufficient to move the first polar fluid through the first and second Laplace barriers.

11. The device of claim 1 further comprising:
a second polar fluid contained in the hydrophobic channel, the second polar fluid moving to a third position within the hydrophobic channel when the first electrode is biased with the first voltage, and the first Laplace barrier operative to restrain the second polar fluid at the third position when the first electrode is biased with the first voltage without merging the first and second polar fluids.

12. The device of claim 11, wherein the second polar fluid merges with the first polar fluid when the first electrode is biased with the second voltage.

13. The device of claim 11, wherein the first and second polar fluids move in respective first and second directions and, when the first electrode is biased with the first voltage or no voltage, the first and second polar fluids are separated.

14. The device of claim 1 further comprising:
a reservoir fluidically coupled with the hydrophobic channel, the reservoir configured to store a volume of the first polar fluid until a portion of the volume of the first polar fluid is introduced into the hydrophobic channel, and the reservoir configured to use Laplace pressure to receive the first polar fluid from the hydrophobic channel when the first electrode is unbiased or the first electrode is biased at a potential less than the first voltage.

15. The device of claim 14 further comprising:
a second electrode configured to be electrically biased for introducing the portion of the volume of the first polar fluid from the reservoir into the hydrophobic channel.

16. The device of claim 14 further comprising:
a hydrophilic layer in the hydrophobic channel, the hydrophilic layer capable of reducing a resistance for introducing the portion of the volume of the first polar fluid from the reservoir into the hydrophobic channel.

17. The device of claim 1 further comprising:
a second electrode; and
a second voltage source electrically connected with the second electrode, wherein the first polar fluid is divided into two volumes within the hydrophobic channel that are on opposite sides of the second electrode when the second electrode is biased by the second voltage source at a first voltage, and the two volumes of the first polar fluid being moved onto the second electrode and combined when the second electrode is biased by the second voltage source at a second voltage, the second voltage on the second electrode being greater than the first voltage on the second electrode.

18. The device of claim 17 further comprising:
a reservoir fluidically coupled to the hydrophobic channel and configured to impart a Laplace pressure onto the first polar fluid in the direction that opposes the movement from the reservoir to the hydrophobic channel, the second electrode is positioned in the hydrophobic channel and adjacent to the reservoir such that the first polar fluid in the reservoir moves into the hydrophobic channel only when the second voltage source is biased with a voltage that generates an electromechanical pressure that overcomes the Laplace pressure, wherein, when the second electrode is biased with no voltage or the first voltage , the first polar fluid splits into a first volume positioned in the hydrophobic channel and a second volume spanning the first reservoir, the first and second volumes being separated by the second electrode.

19. The device of claim 18, wherein the first Laplace barrier is positioned in the hydrophobic channel and adjacent to the second electrode.

20. The device of claim 1 further comprising:
a second electrode arranged to intersect the first electrode; and
a second voltage source electrically connected with the second electrode,
wherein the second voltage source is configured to supply a third voltage that cooperates with the biased first electrode to move the first polar fluid to the first or second position.

21. The device of claim 1 further comprising:
a photoconductor between the first electrode and the dielectric layer.

22. The device of claim 1, wherein the first Laplace barrier is comprised of a visibly colored material.

23. The device of claim 1, wherein the first polar fluid includes a colorant.

24. The device of claim 1, wherein the hydrophobic channel has a width at the location of the first Laplace barrier, and the first Laplace barrier is configured to allow a width of the first polar fluid passing through the first Laplace barrier to be approximately equal to the width of the hydrophobic channel at the location of the first Laplace barrier.

25. The device of claim 1, wherein, when the first polar fluid is at the second position, a first partial volume of the first polar fluid is on one side of the first Laplace barrier and a second partial volume of the first polar fluid is on an opposite side of the first Laplace barrier.

26. The device of claim 1, wherein the first Laplace barrier is operative to maintain the first polar fluid at the first position when the first electrode is unbiased.

27. The device of claim 1 further comprising:
a second polar fluid within the hydrophobic channel, and the first Laplace barrier is positioned between the first and second polar fluids when the first electrode is biased by the first voltage.

28. A method of operating a device, the method comprising:
moving a polar fluid to a first position within the device; and
restraining the polar fluid at the first position by a Laplace barrier,.
moving the polar fluid from the first position to a second position within the device, and
splitting the polar fluid into first and second volumes such that at least one of the first and second volumes resides in the device adjacent to the Laplace barrier.

29. The method according to claim 28, wherein moving the polar fluid from the first position to the second position comprises:
displacing a non-polar fluid within the device.

30. A device comprising:
a first polar fluid;
a non-polar fluid;
a first substrate;
a second substrate arranged relative to the first substrate to define a hydrophobic channel containing the first polar fluid and the non-polar fluid;
a first electrode on the first substrate;
a dielectric layer between the first electrode and the first polar fluid;
a first Laplace barrier within the hydrophobic channel, the first Laplace barrier defining a fluid pathway open to movement of the first polar fluid within the hydrophobic channel; and
a first voltage source electrically connected with the first electrode, the first voltage source configured to electrically bias the first electrode to cause the first polar fluid to move within the hydrophobic channel relative to the first Laplace barrier,
wherein the first polar fluid is moved to a first position within the hydrophobic channel when the first electrode is biased by the first voltage source with a first voltage that is less than or equal to a threshold voltage, and the first polar fluid moves from the first position to a second position within the hydrophobic channel when the first electrode is biased by the first voltage source with a second voltage that is greater than the threshold voltage, and
wherein the hydrophobic channel has a first cross-sectional area at a location that includes the first Laplace barrier, and the fluid pathway has a second cross-sectional area at the location that includes the first Laplace barrier that is at least 50% of the sum of the first and second cross-sectional areas.

31. A device comprising:
a first polar fluid;
a non-polar fluid;
a first substrate;
a second substrate arranged relative to the first substrate to define a hydrophobic channel containing the first polar fluid and the non-polar fluid;
a first electrode on the first substrate;
a dielectric layer between the first electrode and the first polar fluid;
a first Laplace barrier within the hydrophobic channel, the first Laplace barrier defining a fluid pathway open to movement of the first polar fluid within the hydrophobic channel; and
a first voltage source electrically connected with the first electrode, the first voltage source configured to electrically bias the first electrode to cause the first polar fluid to move within the hydrophobic channel relative to the first Laplace barrier,
wherein the first polar fluid is moved to a first position within the hydrophobic channel when the first electrode is biased by the first voltage source with a first voltage that is less than or equal to a threshold voltage, and the first polar fluid moves from the first position to a second position within the hydrophobic channel when the first electrode is biased by the first voltage source with a second voltage that is greater than the threshold voltage, and
wherein the first Laplace barrier is bounded by an exposed surface, and the first polar fluid surrounds the exposed surface of the first Laplace barrier when the first polar fluid is in the second position and the first electrode is unbiased.

* * * * *